(12) United States Patent
Takano et al.

(10) Patent No.: US 10,823,915 B2
(45) Date of Patent: Nov. 3, 2020

(54) HYBRID OPTIC ADAPTER AND CONNECTOR ASSEMBLIES

(71) Applicant: Senko Advanced Components Inc, Marlborough, MA (US)

(72) Inventors: Kazuyoshi Takano, Tokyo (JP); Kimman Wong, Hong Kong (HK)

(73) Assignee: Senko Advanced Components, Inc., Marlborough, MA (US)

( * ) Notice: Subject to any disclaimer, the term of this patent is extended or adjusted under 35 U.S.C. 154(b) by 27 days.

(21) Appl. No.: 16/375,624

(22) Filed: Apr. 4, 2019

(65) Prior Publication Data

US 2019/0235179 A1      Aug. 1, 2019

Related U.S. Application Data

(63) Continuation of application No. 15/009,549, filed on Jan. 28, 2016, now Pat. No. 10,295,753.

(51) Int. Cl.
*G02B 6/38*      (2006.01)

(52) U.S. Cl.
CPC ......... *G02B 6/3825* (2013.01); *G02B 6/3821* (2013.01); *G02B 6/3831* (2013.01); *G02B 6/3891* (2013.01); *G02B 6/3897* (2013.01); *G02B 6/3874* (2013.01); *G02B 6/3893* (2013.01)

(58) Field of Classification Search
CPC .. G02B 6/3825; G02B 6/3821; G02B 6/3897; G02B 6/3891; G02B 6/3831; G02B 6/3874; G02B 6/3893
See application file for complete search history.

(56) References Cited

U.S. PATENT DOCUMENTS

| | | | |
|---|---|---|---|
| 4,892,378 A | | 1/1990 | Zajac et al. |
| 5,274,729 A | | 12/1993 | King et al. |
| 5,719,977 A | | 2/1998 | Lampert et al. |
| 6,151,432 A | * | 11/2000 | Nakajima ............ G02B 6/3831 385/55 |

(Continued)

FOREIGN PATENT DOCUMENTS

| | | |
|---|---|---|
| CN | 103713362 A | 4/2014 |
| EP | 0 023 114 A1 | 1/1981 |
| WO | 2014/049469 A1 | 4/2014 |

OTHER PUBLICATIONS

Non-Final Office Action, U.S. Appl. No. 15/009,549, dated Jul. 13, 2018, pp. 11.

(Continued)

*Primary Examiner* — Ryan A Lepisto
*Assistant Examiner* — Erin D Chiem
(74) *Attorney, Agent, or Firm* — Edward S. Jarmolowicz, Esq.

(57) ABSTRACT

Fiber optic connection assemblies that may include hybrid adapters and connector assemblies are generally described. The hybrid adapter may be configured to connect a first connector type and a second connector type, the first connector type being different from the second connector type. For example, the first connector type may be a micro connector and the second connector type may be an LC connector. A connector assembly may be configured as a micro connector having a tension element configured to facilitate optimized optical performance by spring loading the ferrules while maintaining a small form factor.

19 Claims, 25 Drawing Sheets

(56) References Cited

U.S. PATENT DOCUMENTS

| | | | | |
|---|---|---|---|---|
| 6,347,888 B1* | 2/2002 | Puetz | ............... | G02B 6/3825 |
| | | | | 385/53 |
| 6,367,984 B1* | 4/2002 | Stephenson | ......... | G02B 6/3825 |
| | | | | 385/53 |
| 6,891,735 B2* | 5/2005 | Hultermans | ........... | G02B 6/381 |
| | | | | 361/753 |
| 2006/0193562 A1* | 8/2006 | Theuerkorn | ......... | G02B 6/3831 |
| | | | | 385/53 |
| 2006/0263011 A1* | 11/2006 | Chen | ............... | G02B 6/3825 |
| | | | | 385/75 |
| 2008/0159746 A1* | 7/2008 | Bleus | ................ | G02B 6/444 |
| | | | | 398/116 |
| 2015/0177467 A1* | 6/2015 | Gniadek | ............. | G02B 6/4292 |
| | | | | 385/58 |
| 2015/0338584 A1* | 11/2015 | Islam | ................ | G02B 6/3849 |
| | | | | 385/86 |
| 2016/0306122 A1* | 10/2016 | Tong | ................ | G02B 6/389 |

OTHER PUBLICATIONS

Office Action issued for JP201680080282.8 dated Nov. 28, 2019, 9 pages.

Written Opinion for related PCT Application No. PCT/US2016/016444 dated Mar. 29, 2016, 6 pages, United States.

Extended European Search Report issued for EP16888447.6, dated Nov. 6, 2019, 11 pages.

Nagase, R., et al., "Simplified SC-Type Receptacles for Optical Subscriber Systems," Electronics and Communications in Japan, Part 2, 1997, pp. 39-46, vol. 80, No. 3.

\* cited by examiner

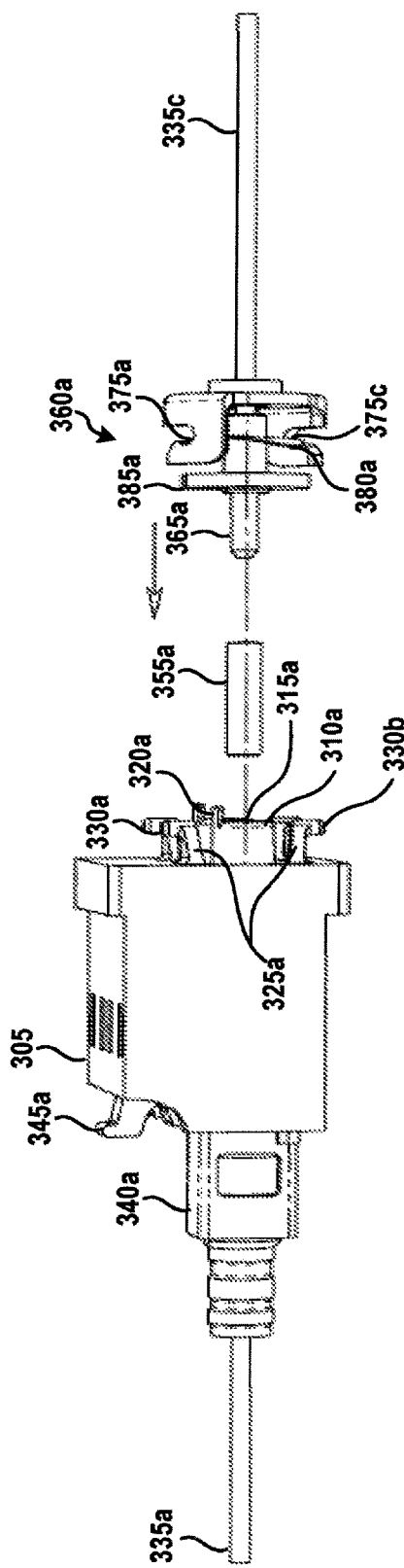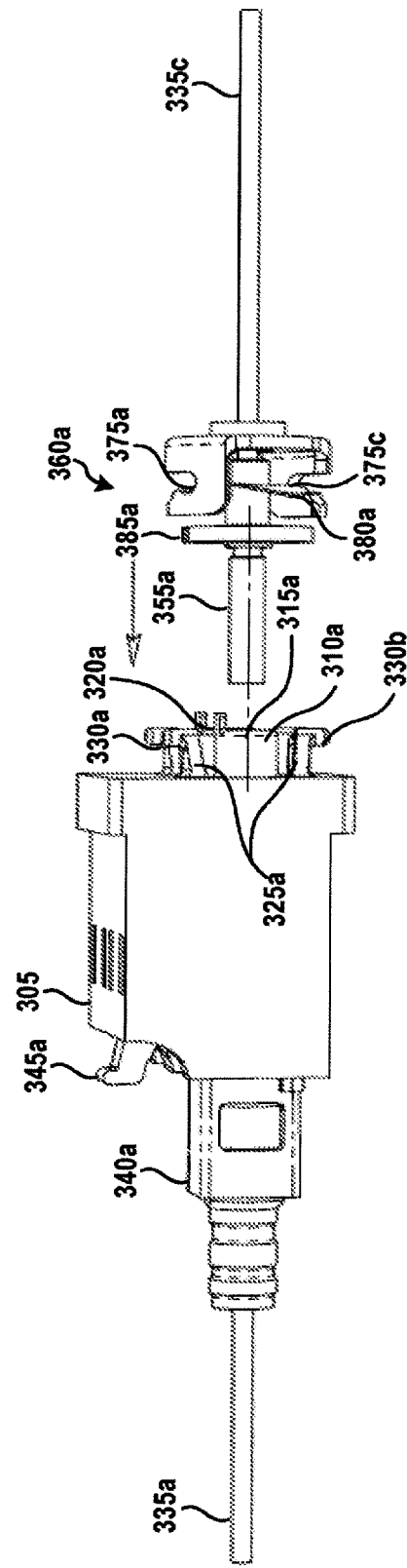
FIG. 11A
FIG. 11B

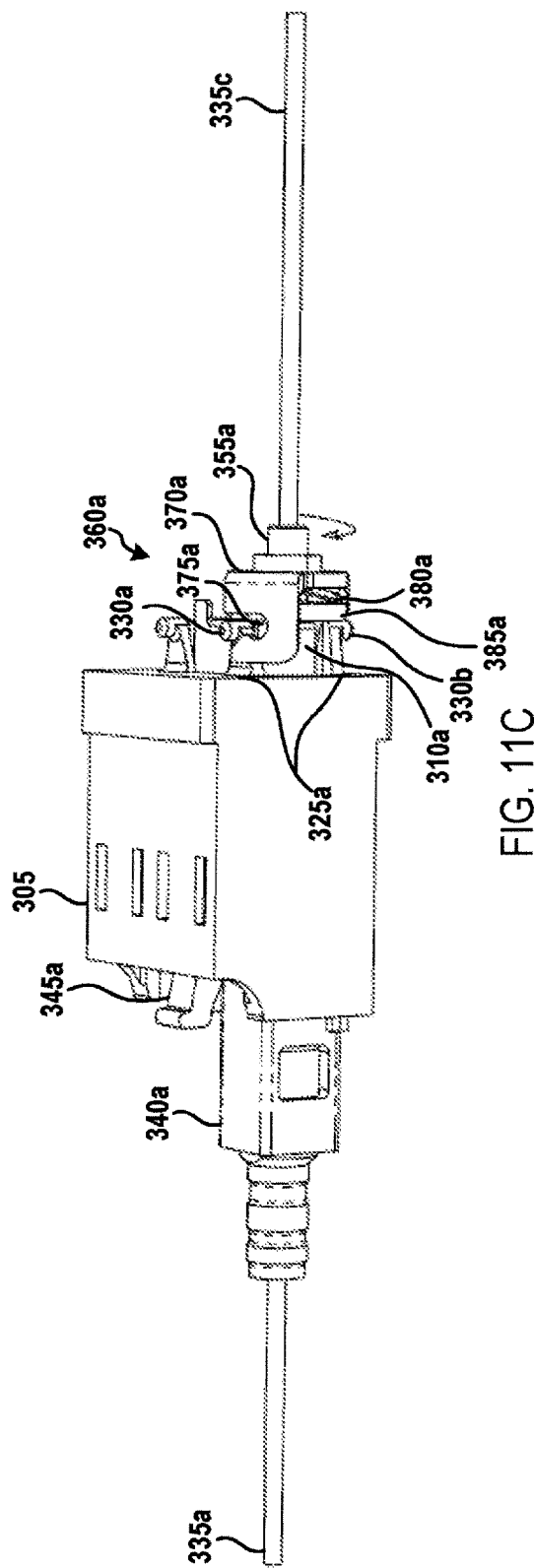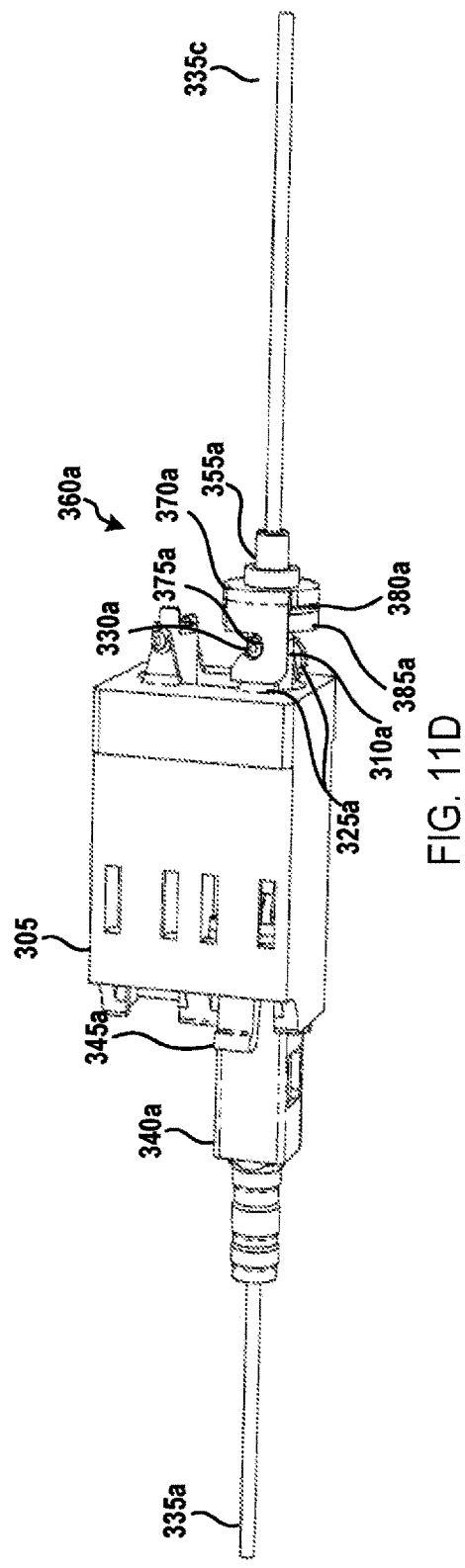
FIG. 11C
FIG. 11D

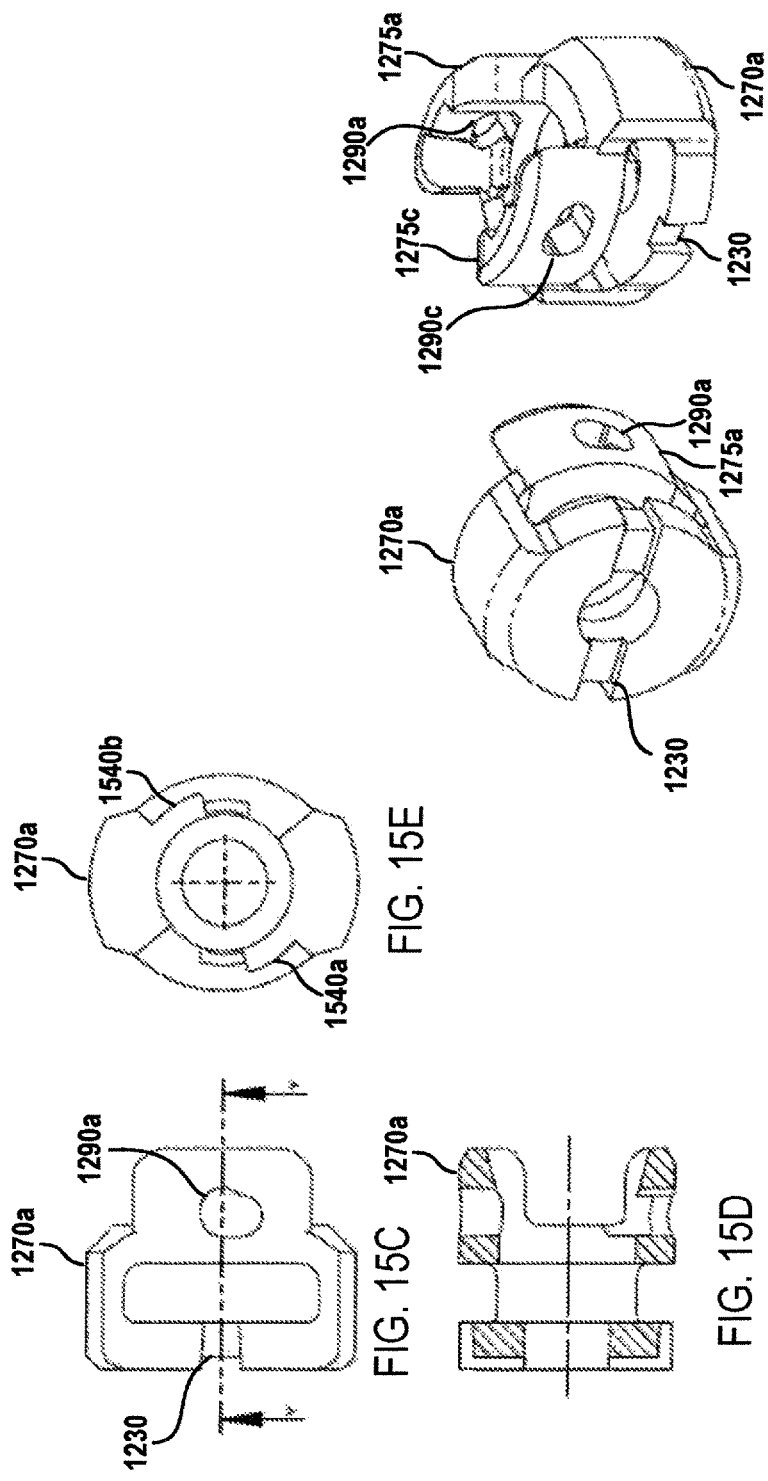

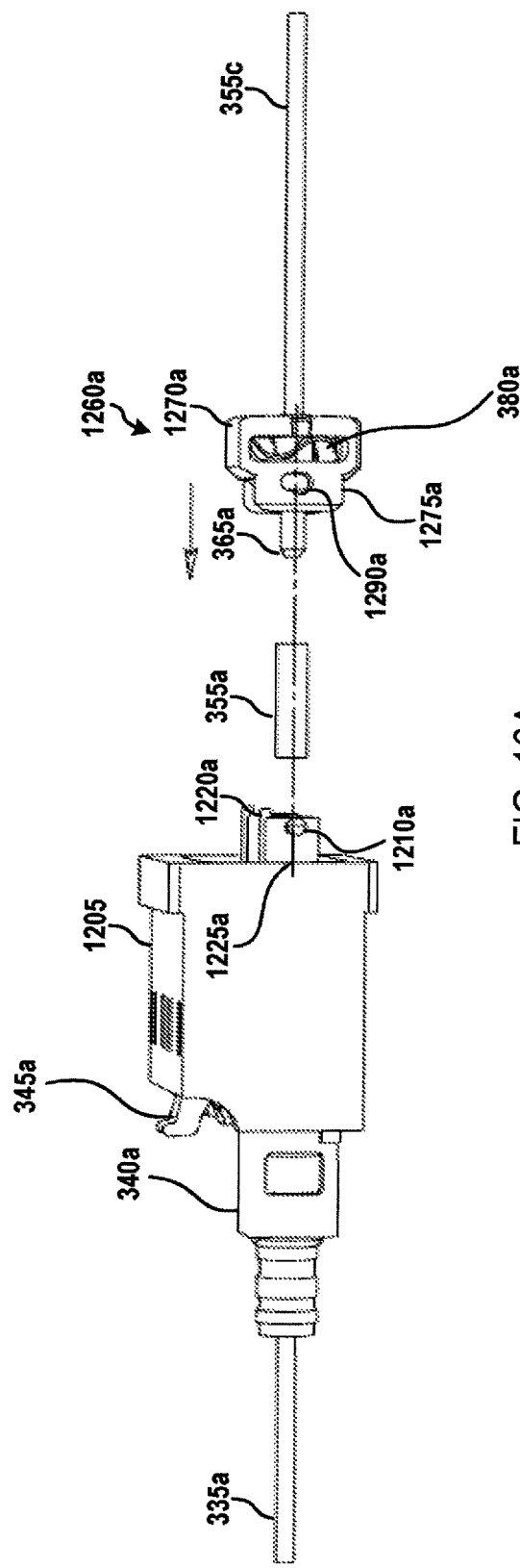
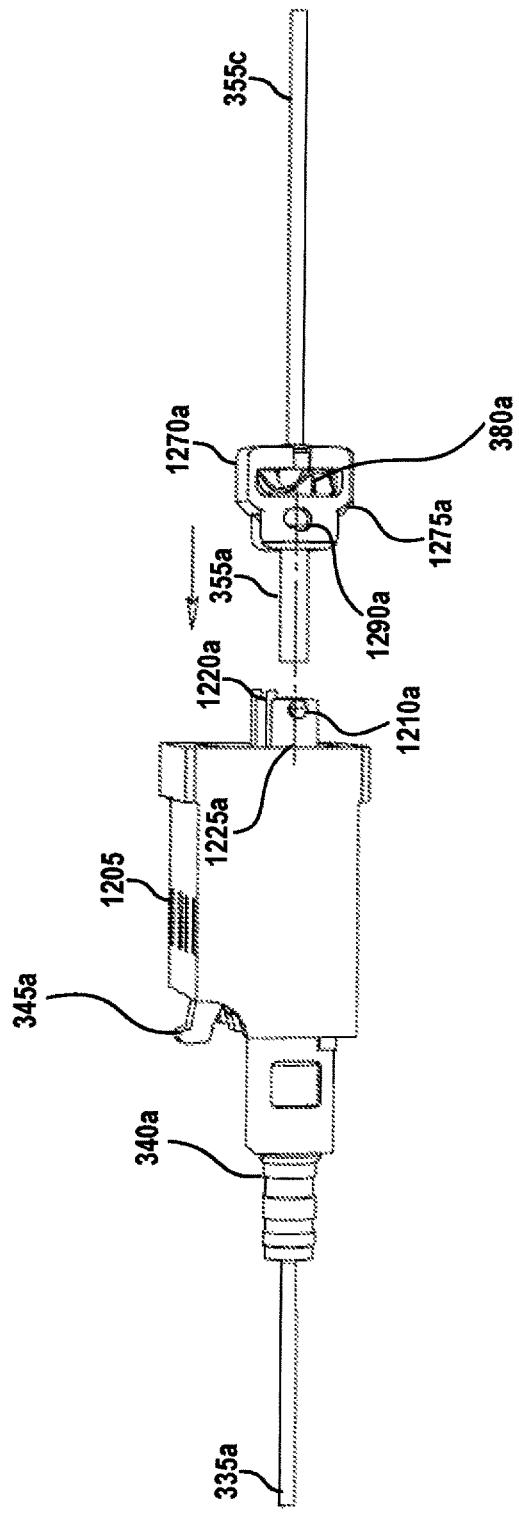

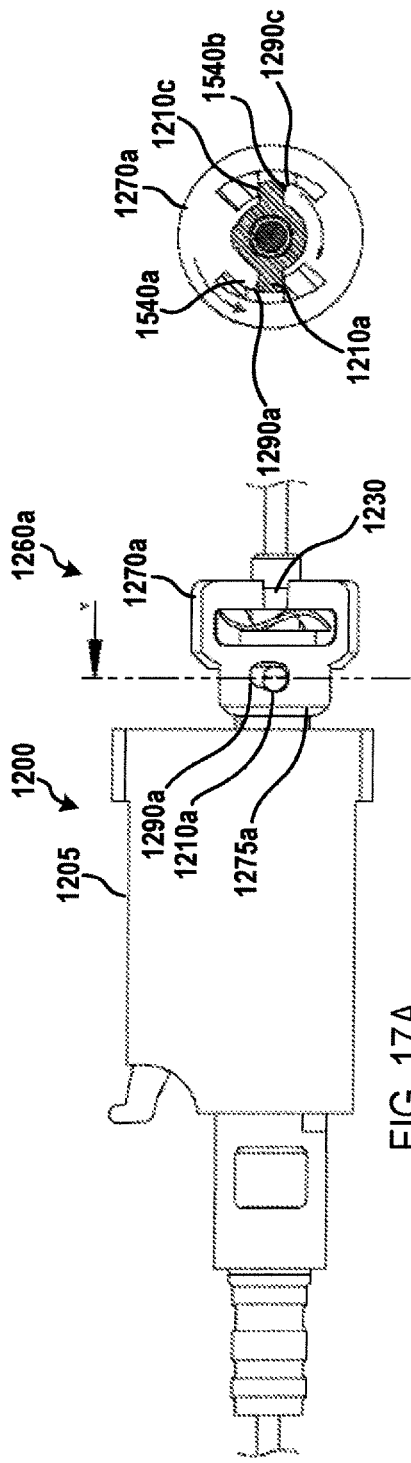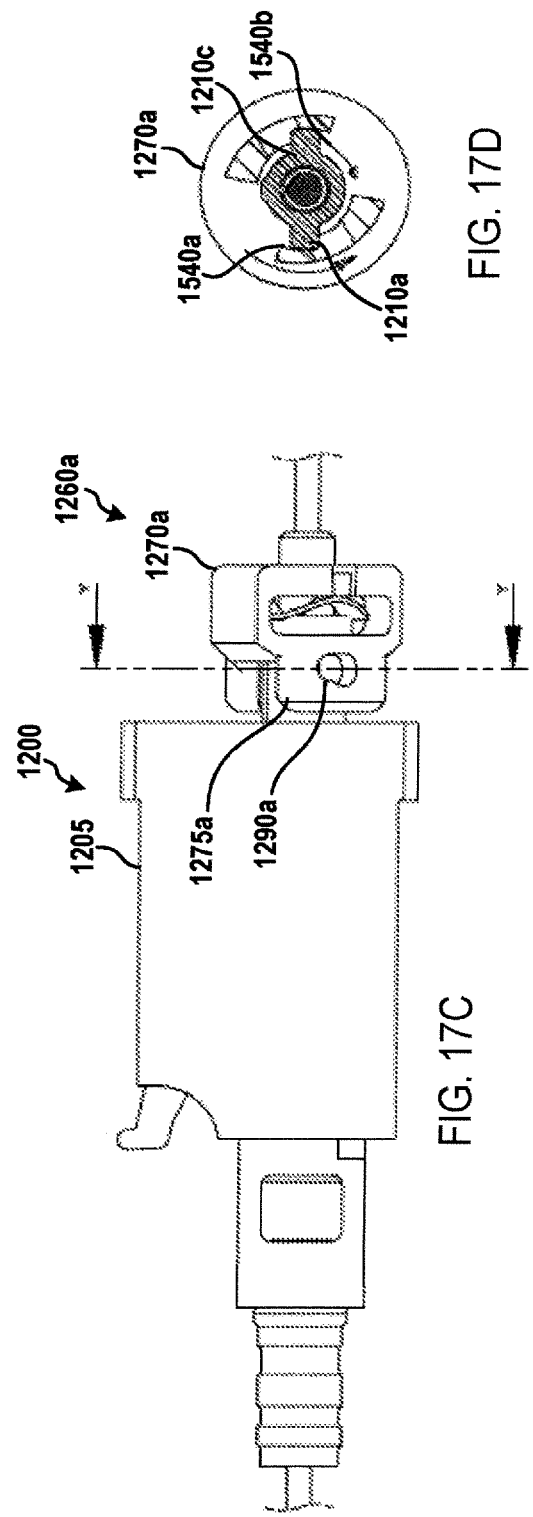

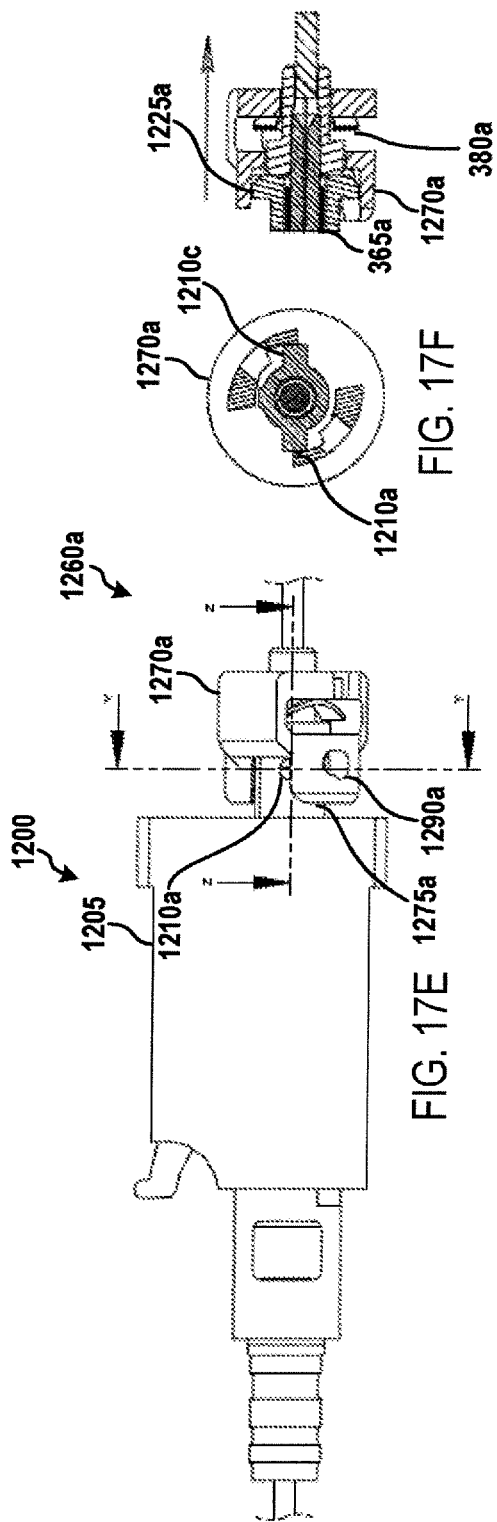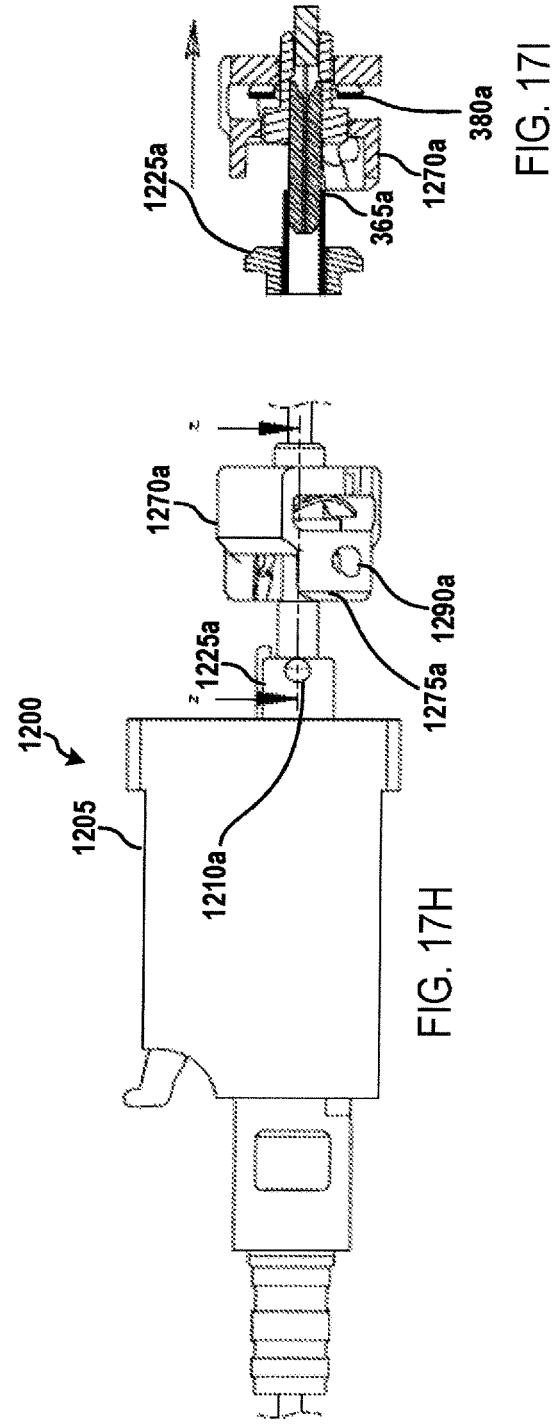

HYBRID OPTIC ADAPTER AND CONNECTOR ASSEMBLIES

RELATED APPLICATIONS

The present application is a Continuation of U.S. patent application Ser. No. 15/009,549 filed on Jan. 28, 2016, title "Fiber Optic Hybrid Adapter and Connector Assemblies", which is incorporated into the present application by reference in its entirety.

FIELD OF THE INVENTION

The described technology generally relates to components for connecting data transmission elements and, more specifically, to adapters configured to connect different types of fiber optic connectors and connector assemblies configured to facilitate optimized performance of the connection formed within the adapter.

BACKGROUND

Fiber optics have become the standard cabling medium used by data centers to meet the growing needs for data volume, transmission speeds, and low losses. An optical fiber connector is a mechanical device disposed at an end of an optical fiber that acts as a connector of optical paths, for example, when optical fibers are joined together. An optical fiber connector may be coupled with an adapter to connect an optical fiber cable to other optical fiber cables or devices. An adapter may generally include a housing having at least one port that is configured to receive and hold a connector to facilitate the optical connection of one connector to another connector or device. For example, an LC adapter is typically configured to receive one or more standard sized LC connectors.

Hybrid adapters are configured to join different types of optical fiber connectors. At least one disadvantage of traditional hybrid adapters is that they are configured to couple two full size connectors causing the adapter ends to be bulky and, therefore, to take up too much space on both sides of the adapter. This is a major shortcoming in most hybrid adapter applications where when one end of the adapter is intended to be disposed inside a small module, as both the corresponding adapter end and the connector occupy too much space within the module.

Certain conventional hybrid adapters have been designed to accommodate coupling a standard full size optical fiber connector with a simplified optical fiber connector. A simplified optical fiber connector is merely a ferrule that may or may not have a metallic flange assembled onto the ferrule used to terminate the end of an optical fiber. At least one disadvantage of such hybrid adapters is that the simplified connector is held rigidly inside the adapter. However, for best optical performance, both ferrules in a mated pair should be floating, and subject to spring pressures that push the end faces of a pair of mated ferrules together. Unlike standard size optical fiber connectors that include an extension spring pre-loaded behind the ferrule which allow the ferrule to float, a simplified optical fiber connector may not include a spring behind the ferrule. Thus, the simplified optical fiber ferrule will be held rigidly inside one end of the adapter and the connection formed by the hybrid adapter will be subject to degraded performance.

Accordingly, there is a need for hybrid optical fiber adapters that occupy less space than conventional hybrid adapters, while enabling better optical performance by providing spring or spring-like pressure that allows the ferrules to float.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, an optical fiber connection assembly may include a hybrid adapter and at least one first optical fiber connector. The hybrid adapter may include a first adapter end configured to be coupled to a first connector type, a second adapter end configured to be coupled to a second connector type that is different from the first connector type, and at least one mating component arranged on the first adapter end. The at least one first optical fiber connector may include a mating housing configured to couple the at least one first optical fiber connector to the second adapter end, and a tension element arranged between the mating housing and the second adapter end, the tension element being configured to facilitate floating of the at least one first optical fiber connector In an embodiment, an optical fiber hybrid adapter may include a first adapter end configured to be coupled to a first connector type, a second adapter end configured to be coupled to a second connector type that is different from the first connector type, and at least one mating component arranged on the first adapter end, in which the mating component may be configured to be coupled to at least one first optical fiber connector. The at least one first optical fiber connector may include a mating housing configured to couple the at least one first optical fiber connector to the second adapter end, and a tension element arranged between the mating housing and the second adapter end, the tension element being configured to facilitate floating of the at least one first optical fiber connector.

BRIEF DESCRIPTION OF THE DRAWINGS

The above and other objects of the present invention will become more readily apparent from the following detailed description taken in connection with the accompanying drawings.

FIGS. 11A-11D depict an illustrative connection assembly according to the first embodiment.

FIGS. 15A-15E depict an illustrative mating element of a connector assembly according to the second embodiment.

FIGS. 16A-16F depict an illustrative connection assembly according to the second embodiment.

FIGS. 17A-17I depict an illustrative connection assembly according to the second embodiment.

DETAILED DESCRIPTION

The described technology generally relates to hybrid fiber optic adapters and fiber optic connectors configured to be coupled thereto. In some embodiments, the hybrid adapters may be configured to occupy less space, for example, within a module than conventional hybrid adapters, while facilitating optimized optical performance. In some embodiments, optimized optical performance is achieved by spring loading the ferrules of a fiber optic connector coupled to the hybrid adapter, thereby allowing the ferrules to float, and tightly securing the ferrules within the adapter.

Figure 1A:
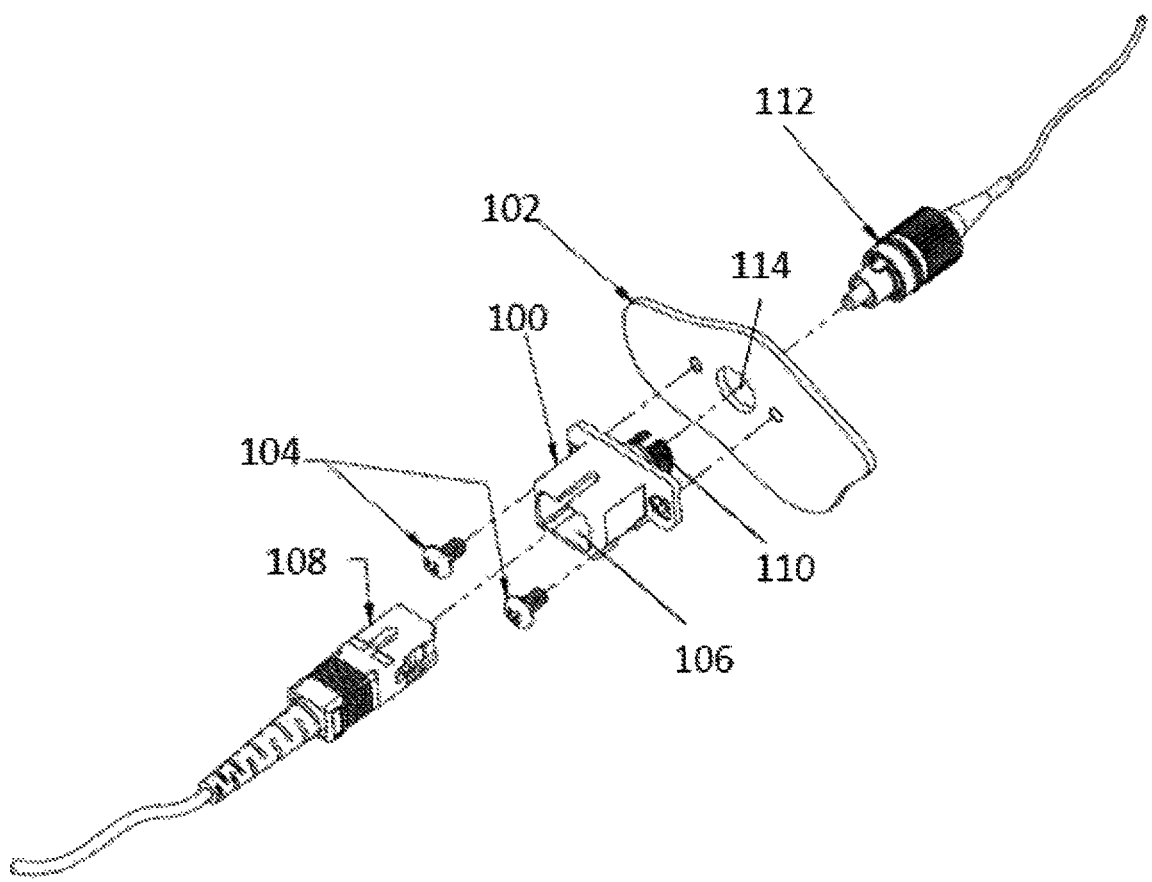
FIG. 1A is an exploded view of a prior art SC-FC hybrid adapter.
Figure 1B:
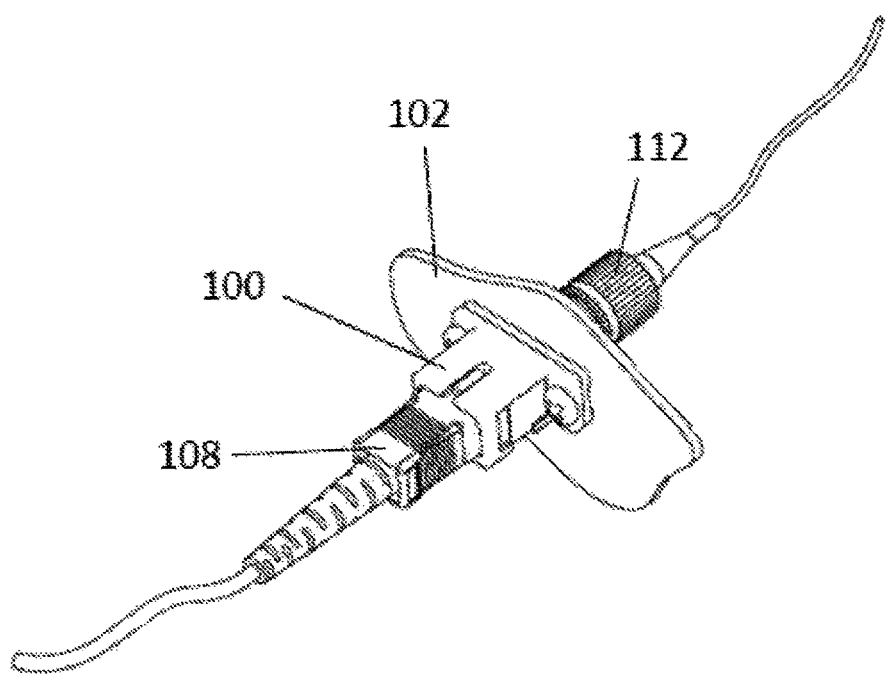
FIG. 1B is a perspective view of the assembled SC-FC hybrid adapter of FIG. 1A.

FIG. 1A shows one example of a hybrid adapter for SC and FC type connectors. The SC-FC hybrid adapter 100 is configured to be mounted on a mounting panel 102 using mounting screws 104. The SC-FC hybrid adapter 100 includes a first adapter end 106 configured to receive an SC connector 108, and a second adapter end 110 configured to receive an FC connector 112. The second adapter end 110 is configured to pass through an opening 114 of the mounting panel 102, allowing each of the SC and FC connectors to be received from opposite sides of the mounting panel. FIG. 1B shows the SC-FC hybrid adapter 100 of FIG. 1A, assembled to the mounting panel 102 and coupled to each of the SC and FC connectors 108 and 112.

Figure 1C:
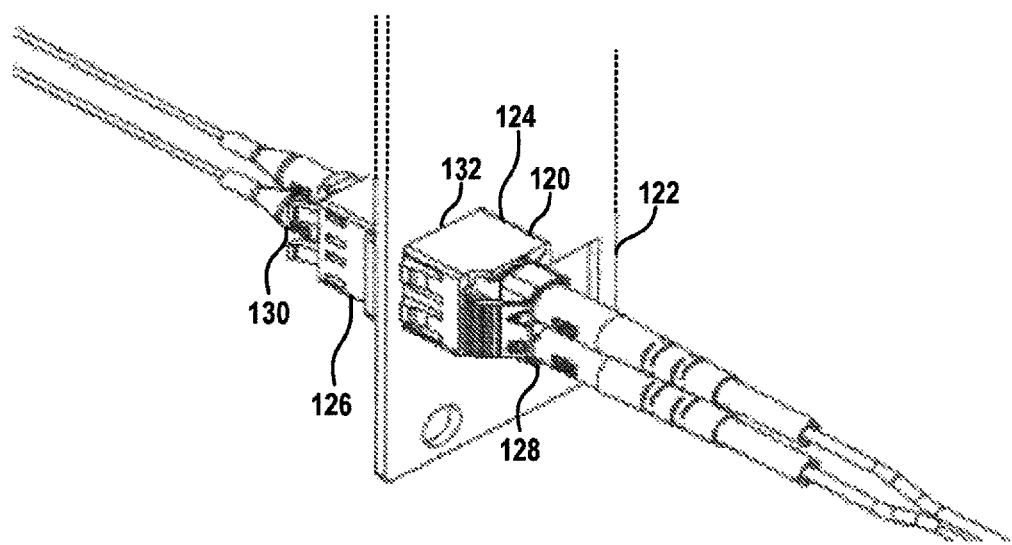
FIG. 1C is a perspective view of an LC-LC adapter.

FIG. 1C shows one example of a hybrid adapter for LC type connectors, for example, duplex LC type connectors. The LC-LC adapter 120 is configured to be mounted on a mounting panel 122. The LC-LC adapter 120 includes a first adapter end 124 configured to receive a first LC connector 128, and a second adapter end 126 configured to receive a second LC connector 130. The second adapter end 126 is configured to pass through an opening 132 of the mounting panel 122, allowing each of the first LC connector 128 and the second LC connector 130 to be received from opposite sides of the mounting panel.

One disadvantage of traditional adapters as shown in FIGS. 1A-1C is that they are bulky, taking too much space on both sides of the adapter. Specifically, they are configured to couple to full size connectors, and thus the corresponding adapter ends are bulky. This is a drawback, for example, when one end of the adapter is intended to be disposed inside a small module, as both the corresponding adapter end and the connector will occupy too much space within the module. Therefore, in lieu of coupling to two full size connectors, some adapters have been designed to accommodate coupling a standard full size optical fiber connector with a simplified optical fiber connector or two simplified optical fiber connectors. A simplified optical fiber connector is merely a ferrule that may or may not have a metallic flange assembled onto the ferrule and which is used to terminate the end of an optical fiber.

Figure 2A:
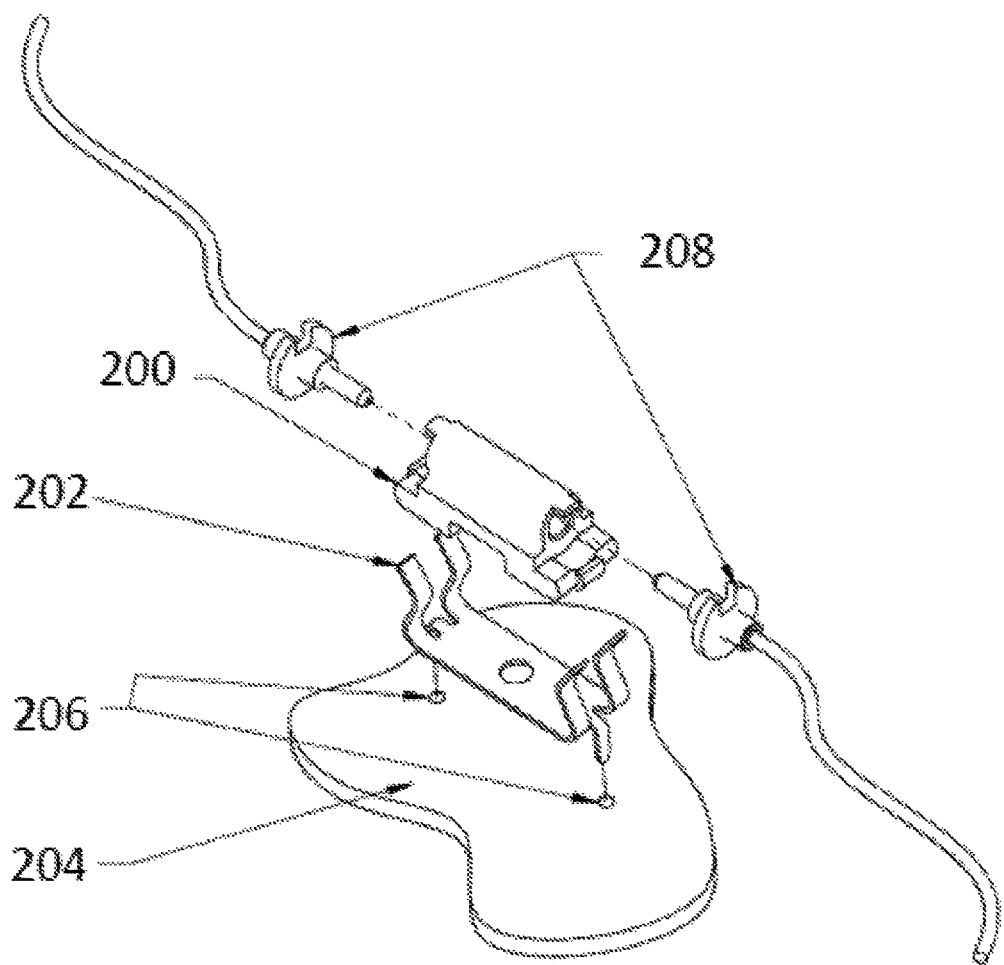
FIG. 2A is an exploded view of a prior art micro circuit board adapter.
Figure 2B:
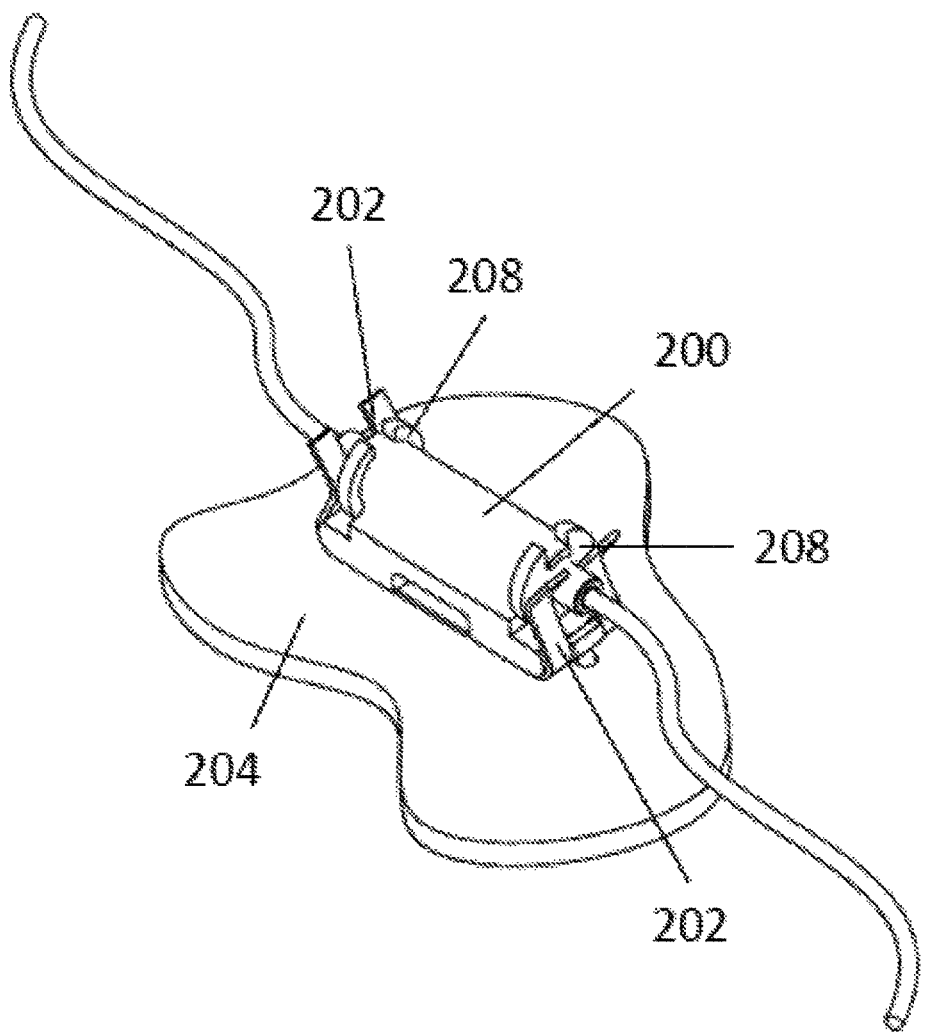
FIG. 2B is a perspective view of the assembled prior art micro circuit board adapter of FIG. 2A.

For example, U.S. Pat. No. 5,719,977 titled "Optical Connector with Immovable Ferrule" discloses an adapter configured to couple to a standard size connector at one end and a simplified optical fiber connector at the other end. However, a disadvantage of such a hybrid adapter is that the simplified connector is held rigidly inside the adapter. Unlike standard size optical fiber connectors which allow the ferrule to float and also include an extension spring that is pre-loaded behind the ferrule, a simplified optical fiber connector may not include a spring behind the ferrule. Thus, the ferrule will be held rigidly inside one end of the adapter. However, for best optical performance, both ferrules in a mated pair should be floating, and subject to spring pressures that push the and faces of a pair of mated ferrules together. For example, FIG. 2A shows a micro circuit board adapter comprising of a ferrule alignment body 200 disposed within a ferrule spring 202. The ferrule spring 202 is mounted on a circuit board 204 via soldering holes 206. The ferrule alignment body 200 is configured to receive micro connectors 208 at each end. FIG. 2B shows the assembled adapter coupled to two micro connectors, such that each micro connector is disposed between a respective end of the ferrule alignment body 200 and a respective end of the ferrule spring 202. However, the adapter of FIGS. 2A and 2B is not a hybrid adapter and is designed for mounting directly on a circuit board rather than coupling an external optical fiber connector to a connector disposed within a module.

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. The term optical fiber cable may further include multi-fiber optic cables having a plurality of the optical fibers.

For connection of cables together or with other optical fiber devices, the terminal ends of a cable may include a connector. A connector may include a housing structure configured to interact with and connect with an adapter. An adapter, in a simple form, may include two aligned ports for aligning optical fiber connectors therein to align and connect optical fibers end-to-end. Hybrid adapters may be configured to couple different types of optical fiber connectors. The hybrid fiber optic adapters and corresponding fiber optic connectors may be referred to as a "connection assembly."

Various embodiments disclosed herein provide hybrid adapters that use minimum space at least at one end of the hybrid adapter. In some embodiments, a hybrid adapter may be configured to be disposed within a module, a device, equipment, a behind-the-wall application, or the like. In some embodiments, a hybrid adapter may be configured to receive a micro optical fiber connector or a simplified optical fiber connector. This is a desirable feature for modules or devices having very little space inside the module, and further reduces or even eliminates obstacles inside the module that might interrupt an otherwise optimum flow of air that is needed to cool electronic circuitry within the module. By contrast, prior art adapters, such as those shown in FIGS. 1A-1C, have bulky ends, both of which are configured to receive standard sized connectors. Various embodiments disclosed herein require less space within a module without sacrificing optical performance by supporting the ferrule with a spring and allowing it to float and tightly securing the fiber optic connector to the adapter. In addition, due to the relatively small form factor, the hybrid adapters configured according to some embodiments may be stackable, while still allowing an installer to remove and/or install connectors.

Figure 3A:
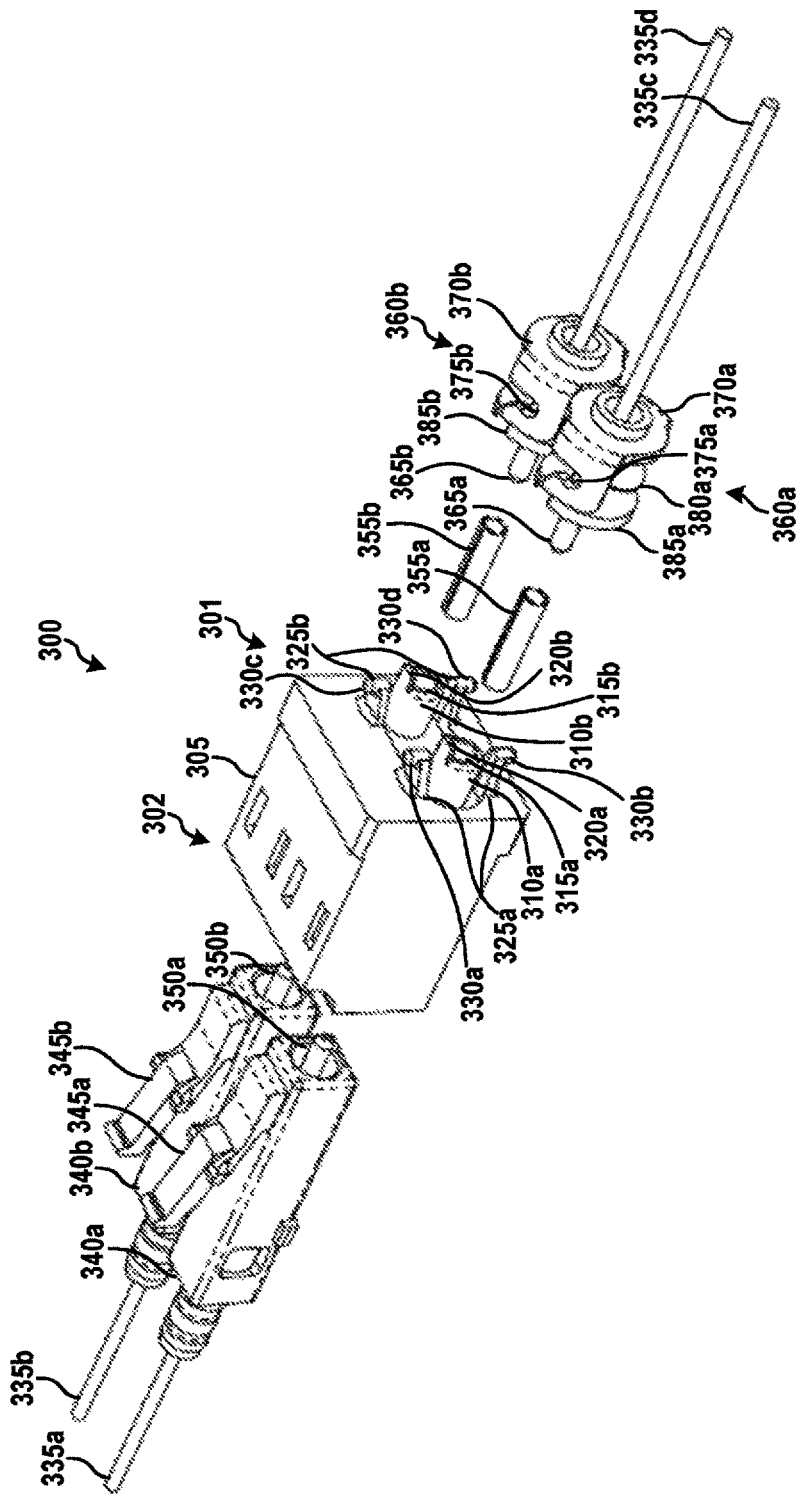
FIGS. 3A and 3B depict an illustrative connection assembly according to a first embodiment.
Figure 3B:
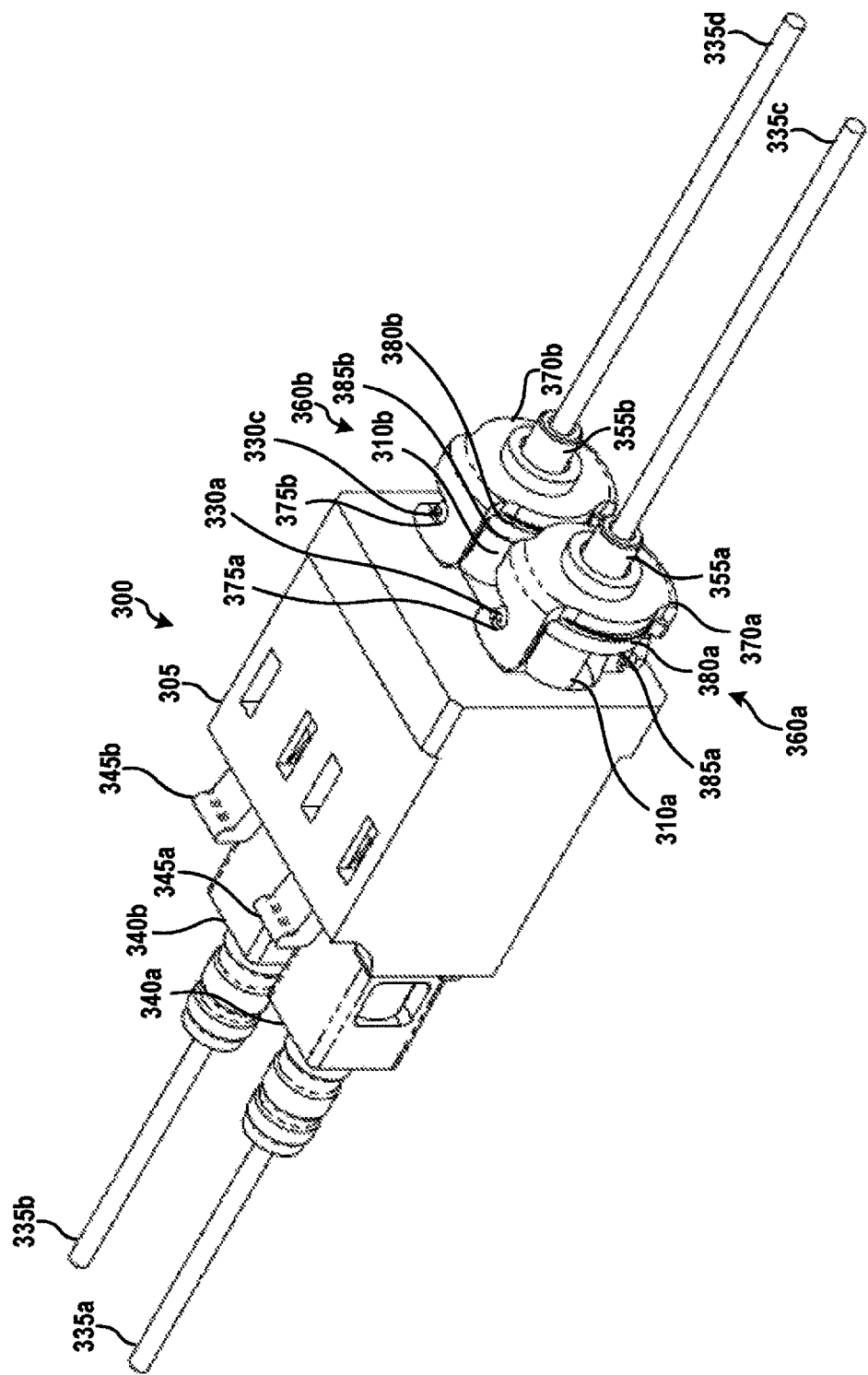

FIG. 3A depicts an exploded view of an illustrative connection assembly according to a first embodiment. FIG. 3B depicts a side view of an assembled illustrative connection assembly according to the first embodiment. As shown in FIGS. 3A and 3B, a connection assembly 300 may include a hybrid adapter 305 having a first end 301 and a second end 302. The first end 301 may be configured to be coupled to one or more connectors having a first connector type and the second end 302 may be configured to be coupled to one or more connectors having a second connector type which is different than the first connector type. In some embodiments, the first end 301 may be configured to be coupled to micro connectors, while the second end 302 may be configured to be coupled to a standard-size connector, such as an LC connector. Although micro and LC connectors are used in illustrative embodiments herein, embodiments are not so limited as any type of connector capable of operating according to some embodiments is contemplated herein.

In the illustrative embodiment depicted in FIG. 3A, the second end 302 may be configured to be coupled to an LC connector, for example, a duplex LC connector having two LC connector plugs 340*s*, 340*b*. The LC connector plugs 340*a*, 340*b* may have ferrules 350*a*, 350*b* each terminating a fiber optic cable 335*a*, 335*b* disposed therein. In some embodiments, the LC connector plugs 340*a*, 340*b* may be coupled to the second end 302 via latches 345*a*, 345*b* arranged on the LC connector plugs 340*a*, 340*b*.

The first end 301 may be configured to be coupled to a micro (or "simplified") connector 360*a*, 360*b*. The first end 301 may include a connector interface having a sleeve holder 310*a*, 310*b* that includes an alignment key 320*s*, 320*b*. The sleeve holder 310*a*, 310*b* may be configured to receive a sleeve (or "alignment sleeve") 355, 355*b* within a port 315*s*, 315*b* disposed therein. The sleeve 355*a*, 355*b* may be configured to facilitate the alignment of the ferrule 365*a*, 365*b* with the ferrule 350*s*, 350*b* within the adapter. A mating component 325*a*, 325*b* may be configured to facilitate the coupling of the first side 301 to a connector assembly 360*a*, 360*b*.

The connector assembly 360*a*, 360*b* may include a ferrule 365*a*, 365*b* that terminates a fiber optic cable 335*c*, 335*d* extending therethrough. In some embodiments, the connector assembly 360*a*, 360*b* may include a mating housing 370*a*, 370*b*, a tension element 380*a*, and a ferrule flange 385*a*, 385*b*. In some embodiments, the tension element 380*a* may be formed from a polymer material, a metal material, a combination thereof. In some embodiments, the tension element 380*a* may be formed from aluminum, steel, a sheet metal material, or a combination thereof. In some embodiments, the mating housing 370*a*, 370*b* may be configured as a bayonet-style connector, such as a groove-based bayonet connector having grooves 375*a*, 375*b* configured to couple the mating housing 370*a*, 370*b* to the mating component 325*a*, 325*b* by rotatably engaging the posts (or "bayonet posts") 330*a*-*c*.

Figure 4A:
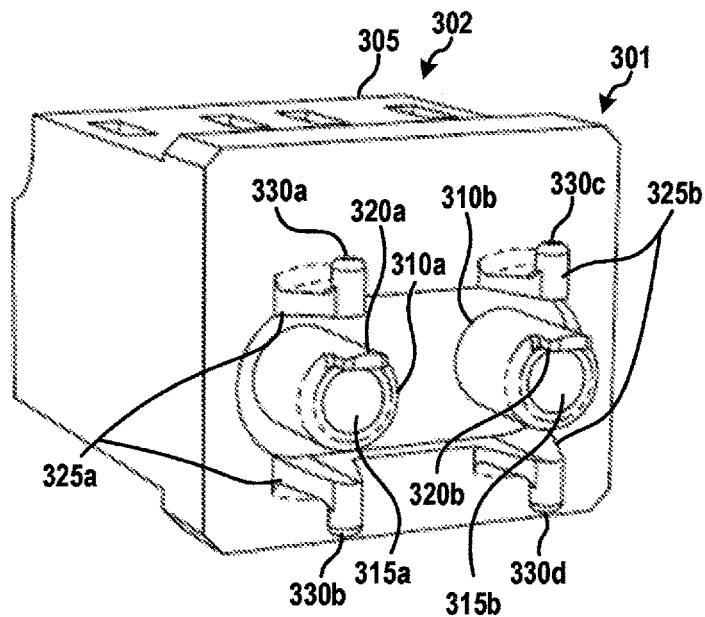
FIGS. 4A and 4B depict an illustrative hybrid adapter according to the first embodiment.
Figure 4B:
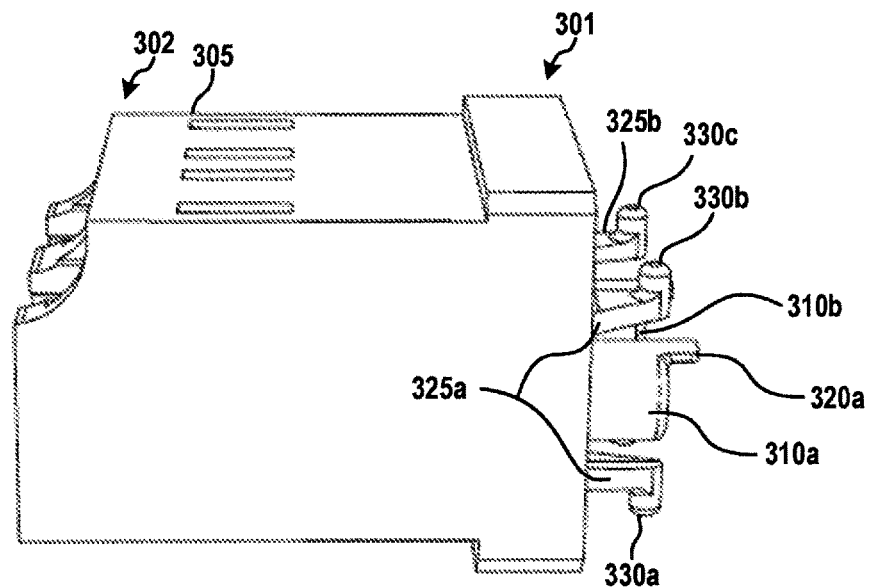
Figure 5A:
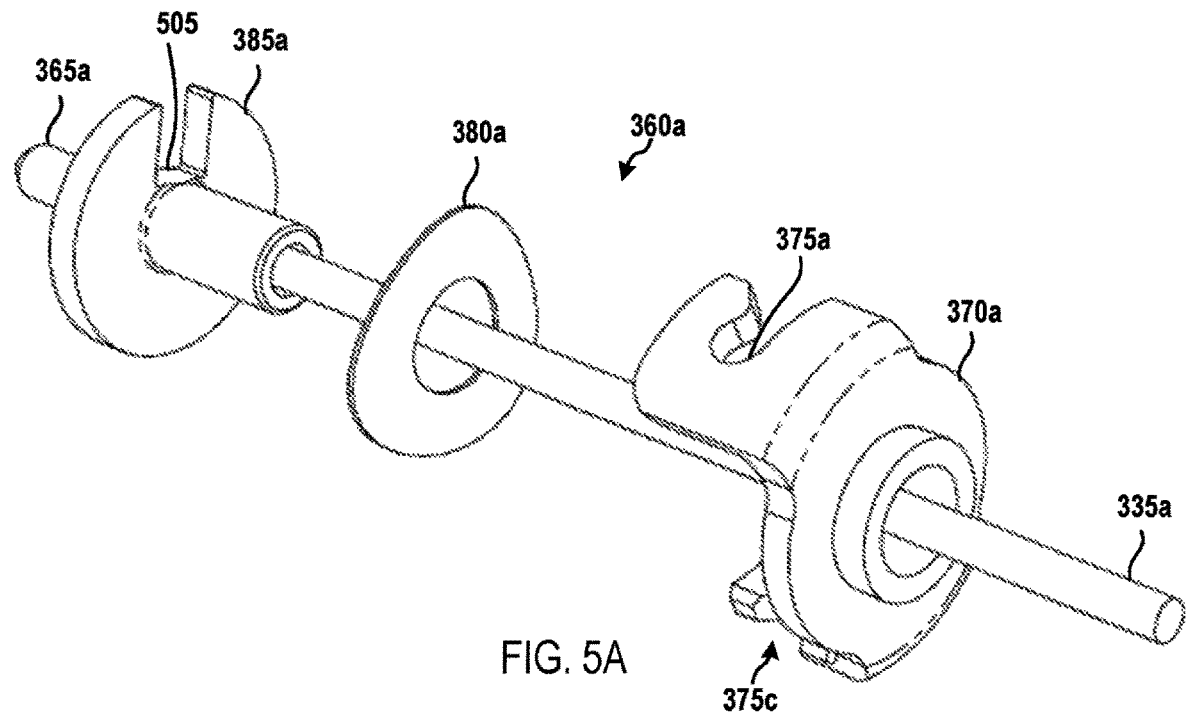
FIGS. 5A and 5B depict an illustrative connector assembly according to the first embodiment.
Figure 5B:
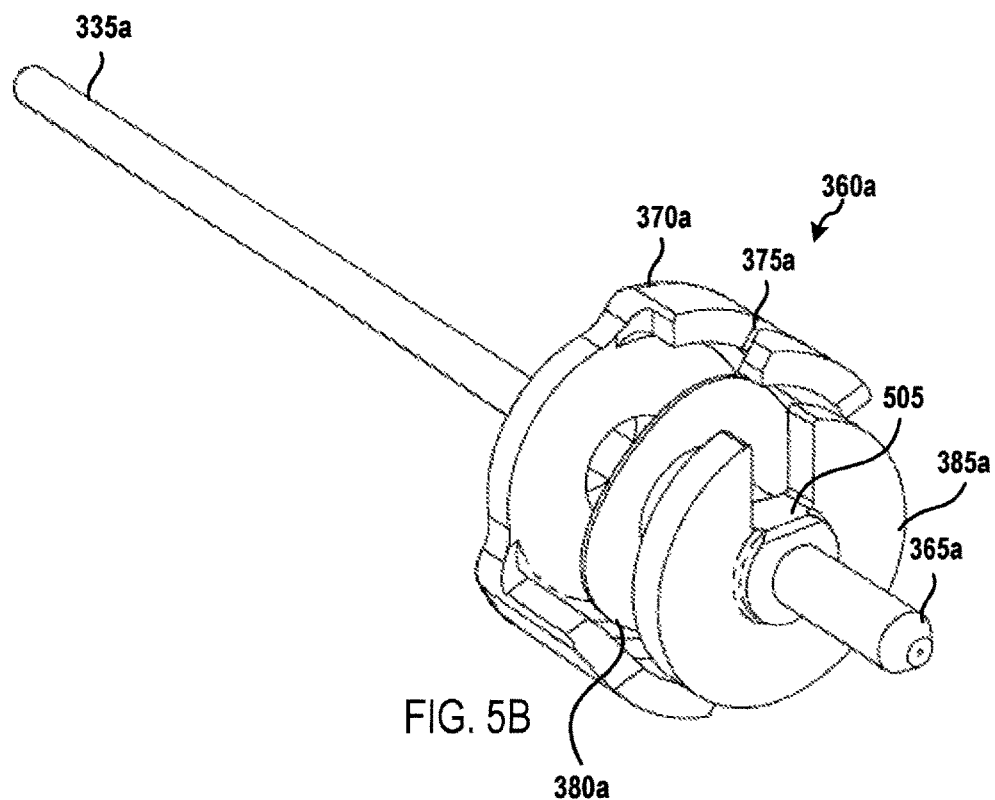
Figure 7B:
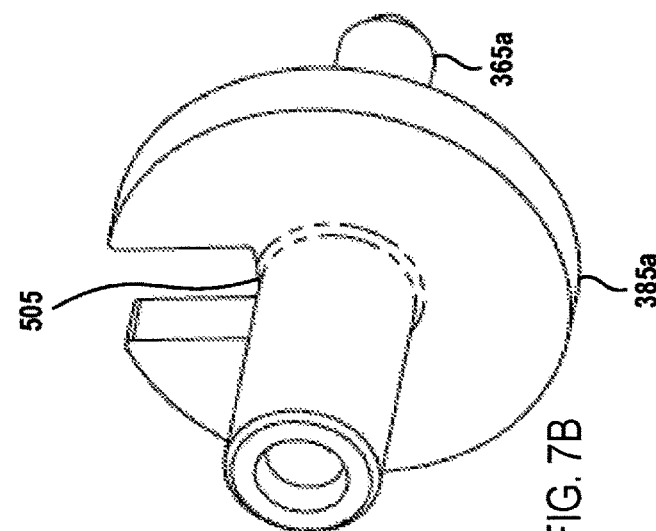
FIGS. 7A and 7B depict an illustrative ferrule flange of a connector assembly according to the first embodiment.
Figure 6:
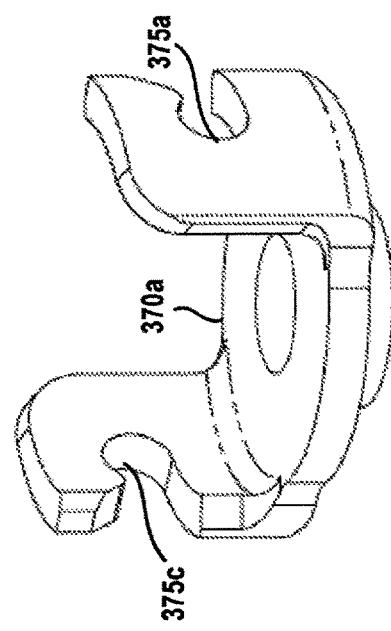
FIG. 6 depicts an illustrative mating element of a connector assembly according to the first embodiment.
Figure 7A:
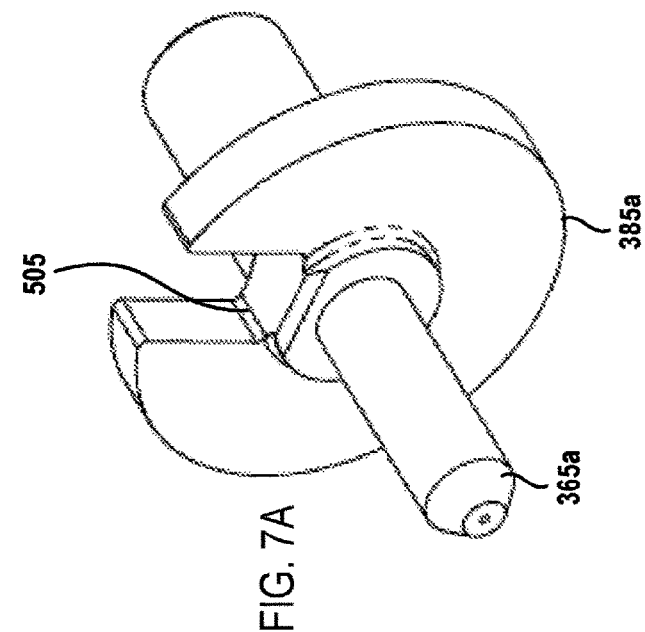

FIGS. 4A and 4B depict an isometric view and a side view, respectively, of illustrative hybrid adapter 305 according to the first embodiment. FIGS. 5A and 5B depict an exploded isometric view and an assembled isometric view of an illustrative connector assembly 360*a* according to the first embodiment. As shown in FIGS. 5A and 5B, the ferrule flange 385*a* may include a key slot 505. In some embodiments, the use of an alignment key 320*a* and the corresponding key slot 505 may allow for the connection assembly 300 to be used in angled physical contact (APC) applications and ultra-physical contact (UPC) applications. In some embodiments, the key slot 505 may be configured to correspond to the alignment key 320*a* in order to align the ferrule flange 385*a* and/or to prevent the rotation thereof when the connector assembly 360*a* is coupled to the hybrid adapter 305. The tension element 380*a* may be arranged between the mating housing 370*a* and the ferrule flange 385*a*. The tension element 380*a* may allow the connector assembly 360*a* (a "micro" or "simplified" connector, which is not spring loaded according to conventional technology) to be spring loaded (or "float"), for example, while maintaining the small form factor of a micro or simplified connector. FIG. 6 depicts an illustrative mating housing 370*a* according to a first embodiment that includes bayonet grooves 375*a*, 375*e* configured to form a bayonet-type connection with the mating component 325*a*, 325*b* of the hybrid adapter 305. FIGS. 7A and 7B depict a front isometric view and a back isometric view, respectively, of an illustrative ferrule flange 385 according to the first embodiment.

Figure 8A:
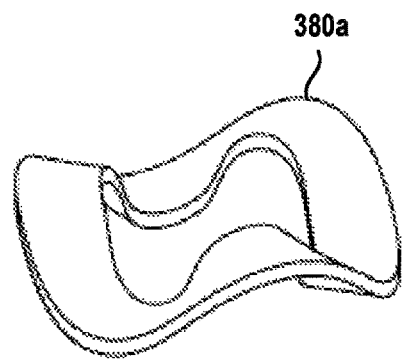
FIGS. 8A-8F depict an illustrative tension element of a connector assembly according to a first embodiment.
Figure 8E:
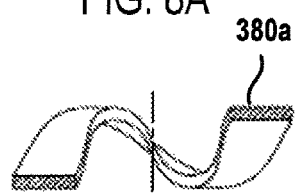
Figure 8B:
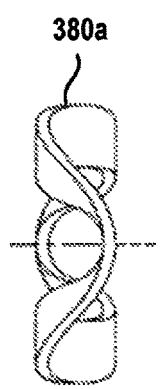
Figure 8D:
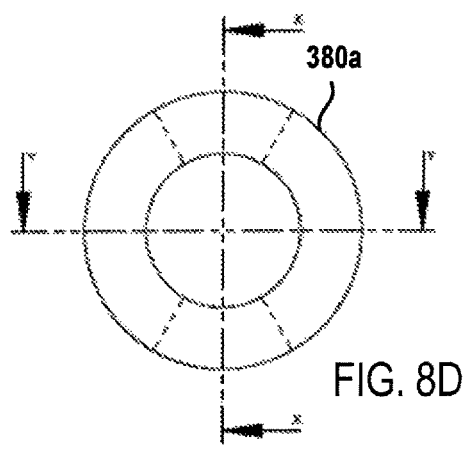
Figure 8F:
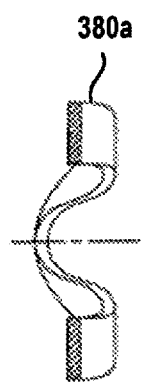
Figure 8C:
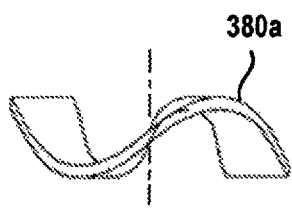
Figure 9A:
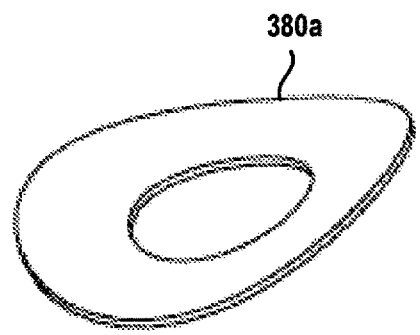
FIGS. 9A-9F depict an illustrative tension element of a connector assembly according to a second embodiment.
Figure 9E:
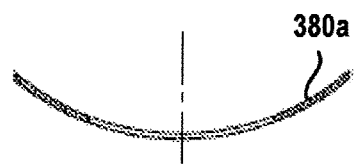
Figure 9B:
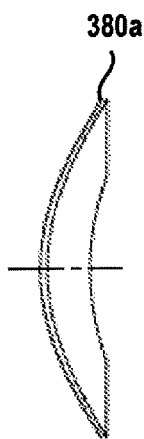
Figure 9D:
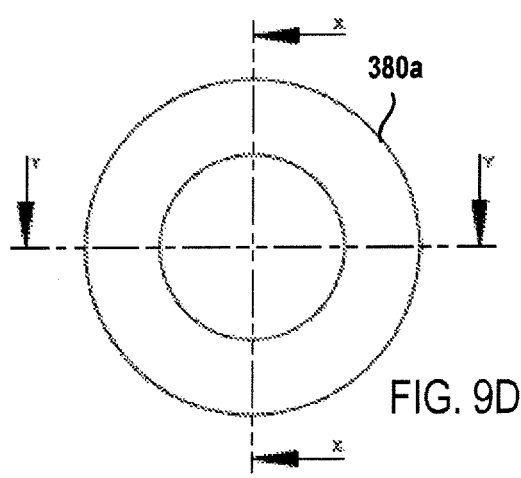
Figure 9F:
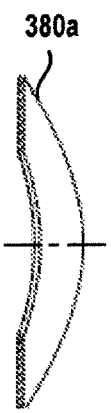
Figure 9C:
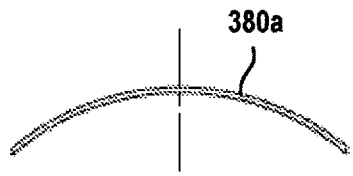
Figure 10A:
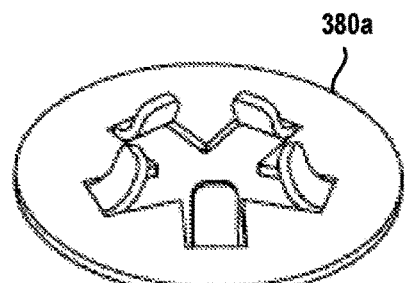
FIGS. 10A-10E depict an illustrative tension element of a connector assembly according to a third embodiment.
Figure 10B:
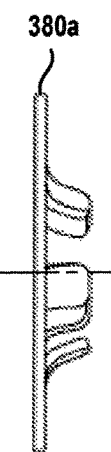
Figure 10D:
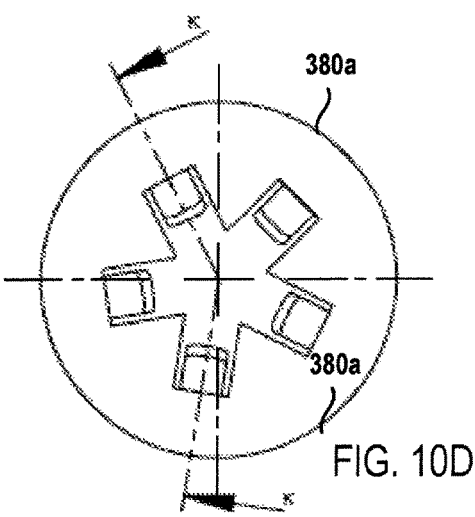
Figure 10E:
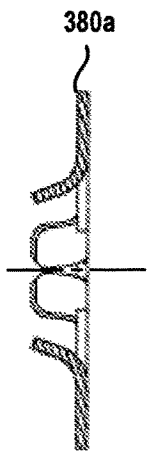
Figure 10C:
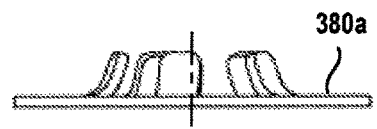

The tension element 380*a*, 380*b* may have various shapes and dimensions. In some embodiments, the tension element 380*a*, 380*b* may have a conventional spring shape, such as the springs used in a typical LC connector. FIGS. 8A-8F depict a tension element 385*a* according to a first embodiment (a "wavy" spring embodiment). FIG. 8E depicts a cross-sectional view through line Y-Y of FIG. 8D and FIG. 8F depicts a cross-sectional view through line X-X of FIG. 8D. FIGS. 9A-9F depict a tension element 385*a* according to a second embodiment (a "curved" spring embodiment). FIG. 9E depicts a cross-sectional view through line Y-Y of FIG. 9D and FIG. 9F depicts a cross-sectional view through line X-X of FIG. 9D. FIGS. 10A-10E depict a tension element 385*a* according to a third embodiment. FIG. 10E depicts a cross-sectional view through line K-K of FIG. 9D (a "tabbed" spring embodiment).

FIGS. 11A-11D depict an illustrative connection assembly according to the first embodiment. In particular, FIGS. 1A-11D depict an illustrative process for connecting a connector assembly 360*a* to the adapter 305. As shown in FIGS. 11A and 11B, an installer may align the ferrule 365*a* with the alignment sleeve 355*a* and the alignment sleeve holder 310*a* and initiate moving the connector assembly 360*a* toward the first side 301 of the adapter 305 to place the ferrule within the alignment sleeve. As shown in FIGS. 11C and 11D, the connector assembly 360*a* may be positioned over the mating component 325*a* in an orientation such that the bayonet posts 330*a* enter the opening of the bayonet grooves 375*a*. In addition, the connector assembly 360*a* may be positioned over the mating component 325*a* in an orientation such that alignment key 320*a* aligns with the alignment slot 505. The mating component 325*a* may be rotated to move the bayonet posts 330a through the bayonet grooves 375a to mate the connector assembly 360a to the mating component 325a and, therefore, the adapter 305.

Figure 12A:
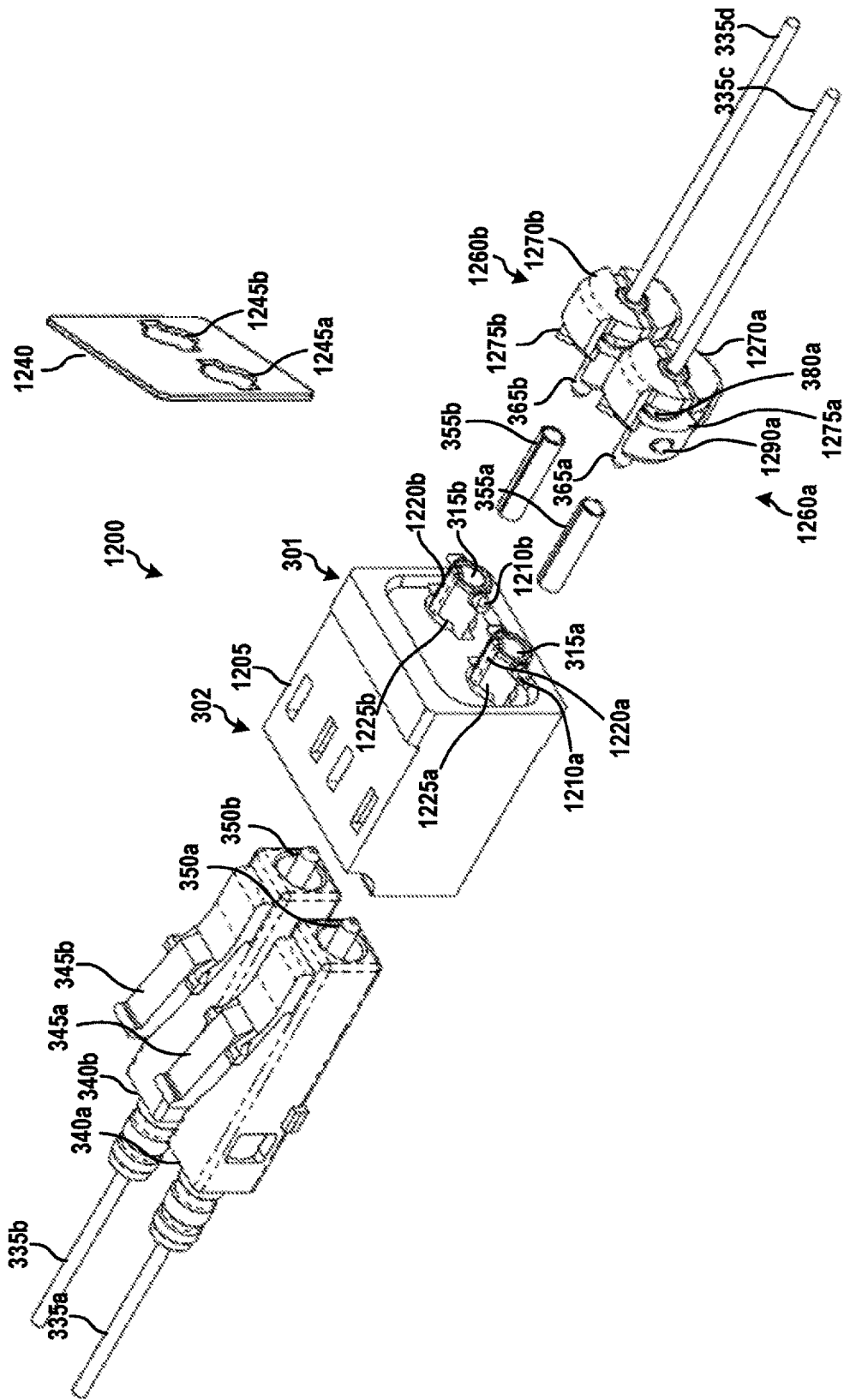
FIGS. 12A and 12B depict an illustrative connection assembly according to a second embodiment.
Figure 12B:
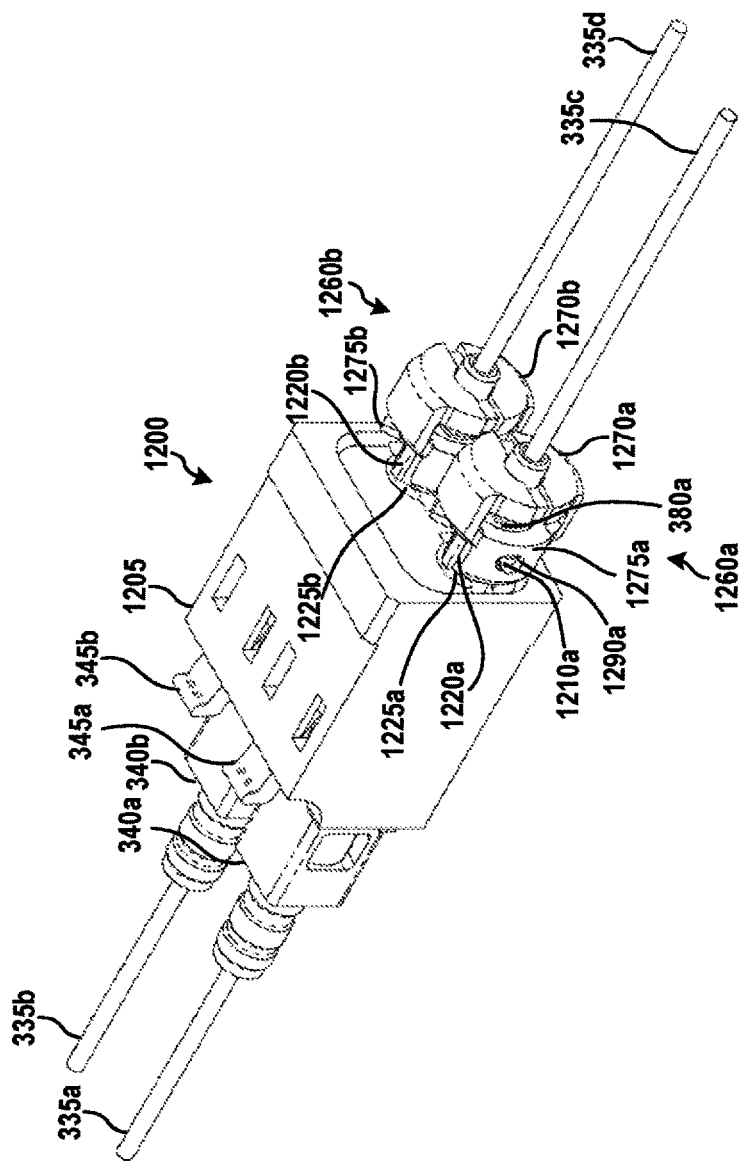

FIGS. 12A and 12B depict an exploded view and an assembled view, respectively, of an illustrative connection assembly 1200 according to a second embodiment. As shown in FIGS. 12A and 12B, an adapter 1205 may include a connector interface having a mating component 1225a, 1225b that includes a post (or "locking post") 1210a, 1210b and an alignment key 1220a, 1220b. A connector assembly 1260a, 1260b may include a mating housing 1270a, 1270b having a wall 1275a, 1275b with a post opening 1290a, 1290b arranged therein. The connector assembly 1260a, 1260b may be configured to engage the locking posts 1210a, 1210b via a snap-fit bayonet connection.

In some embodiments, a shielding component 1240 may be arranged on the adapter 1205, such as on the first side 301 thereof. In some embodiments, the shielding component 1240 may be configured as an electromagnetic interference (EMI) shield. In some embodiments, the shielding component 1240 may include openings 1245a, 1245b configured to receive the mating component 1225a, 1225b such that the shielding component may be installed on the connector interface of the first side 301.

Figure 13A:
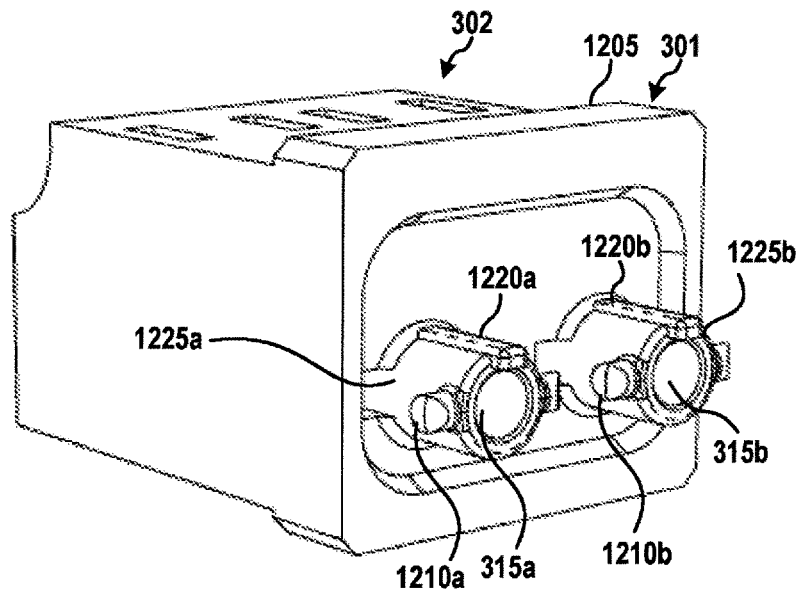
FIGS. 13A and 13B depict an illustrative hybrid adapter according to the second embodiment.
Figure 13B:
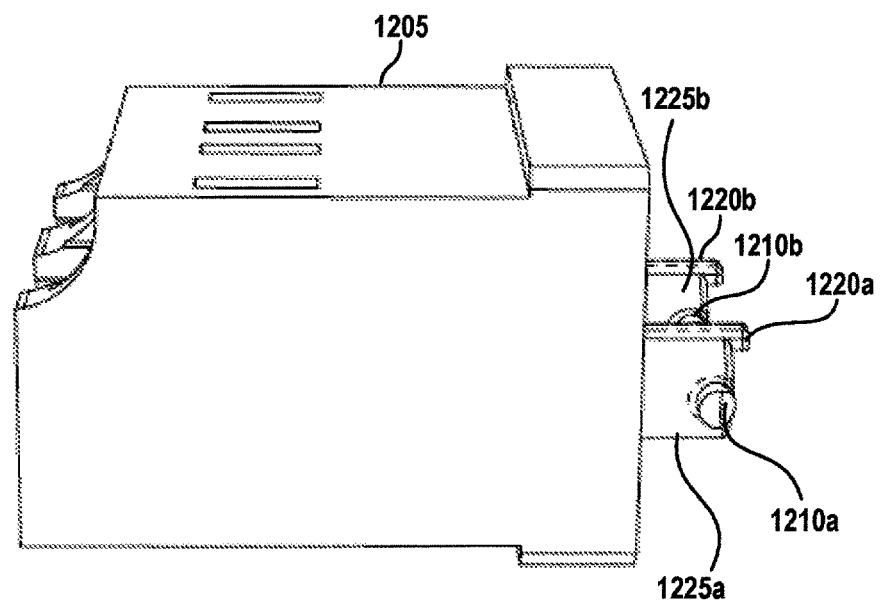
Figure 14A:
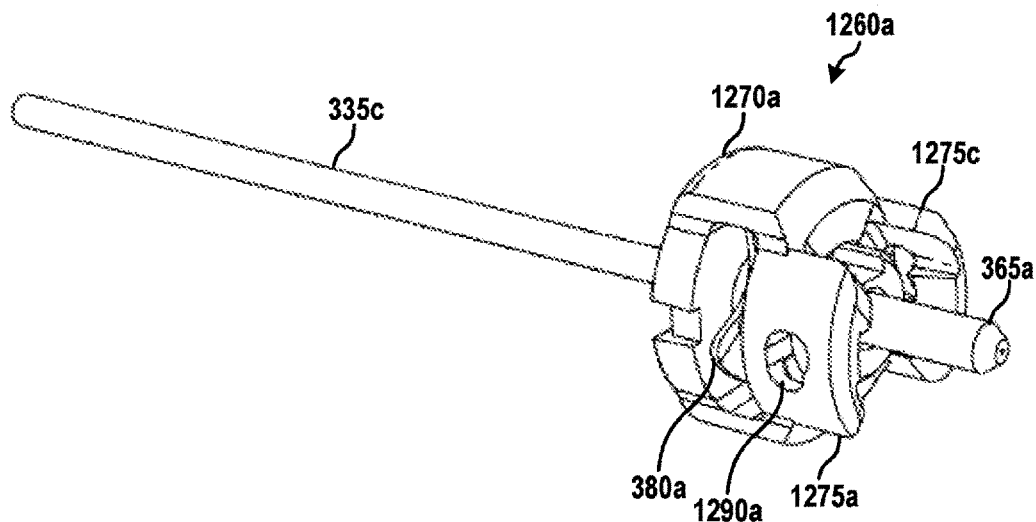
FIGS. 14A and 14B depict an illustrative connector assembly according to the second embodiment.
Figure 14B:
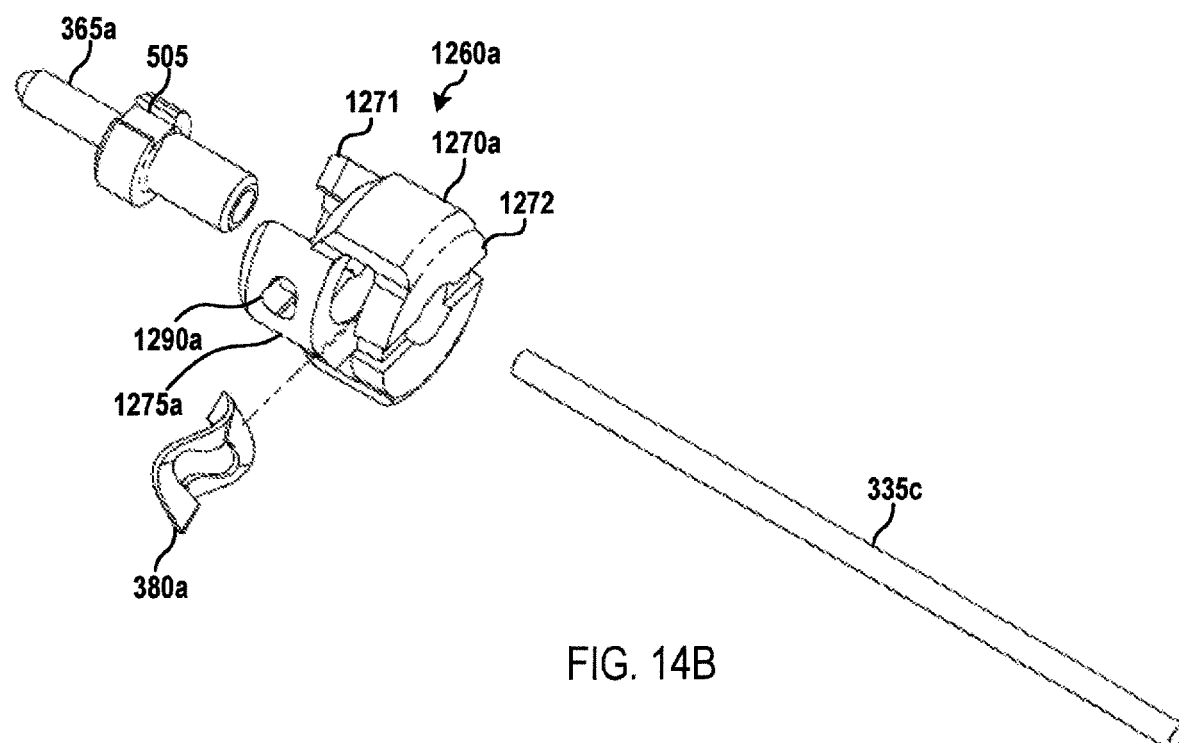

FIGS. 13A and 13B depict a front isometric view and a side view, respectively, of an illustrative adapter 1205 according to the second embodiment. FIGS. 14A and 14B depict an assembled view and an exploded view, respectively, of a connector assembly 1260a according to the second embodiment. As shown in FIG. 14B, the tension component 380a may be installed through an opening between a first portion 1271 and a second portion 1272 of the mating housing 1270a, for example, before the fiber optic cable 335 is inserted into the ferrule 365a. FIGS. 15A-15B depict various view of an illustrative mating housing 1270a according to the second embodiment. FIGS. 15A and 15B are isometric views of the mating housing 1270a, showing a groove 1230 in a bottom portion thereof. In some embodiments, the groove 1230 may be configured to receive one or more tools to use in twisting, turning, pushing, or the like on the mating housing 1270a, for example, to install and/or remove the mating housing from the adapter 1205. FIG. 15C depicts a side view of the mating housing 1270a and FIG. 15D depicts a cross section through line Y-Y of FIG. 15C. As shown in FIG. 15D, the angled front surfaces of the mating housing 1270a facilitates the movement of the locking post 1210a into the interior of the mating housing 1270a. FIG. 15E depicts a front view of the mating housing 12703. As shown in FIG. 15E, the mating housing 1270a may include a housing wall 1540a, 1540b having a non-symmetric thickness, which allows the locking post 1210a to rotate and move along in a horizontal direction, for example, when disconnecting the mating housing 1270a from the mating component 1225a.

Figure 16C:
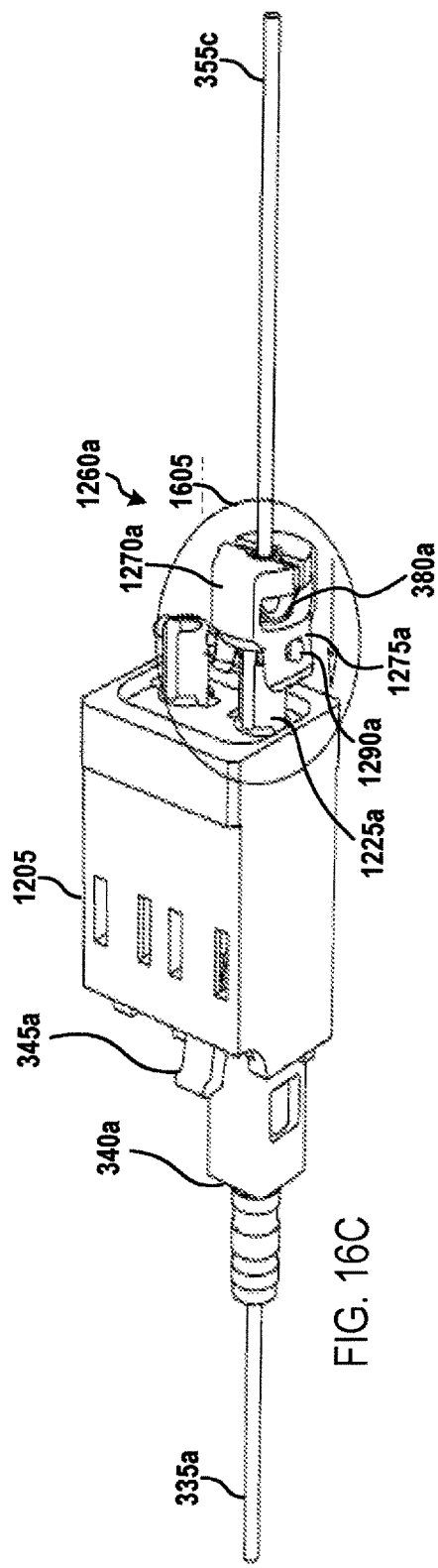
Figure 16D:
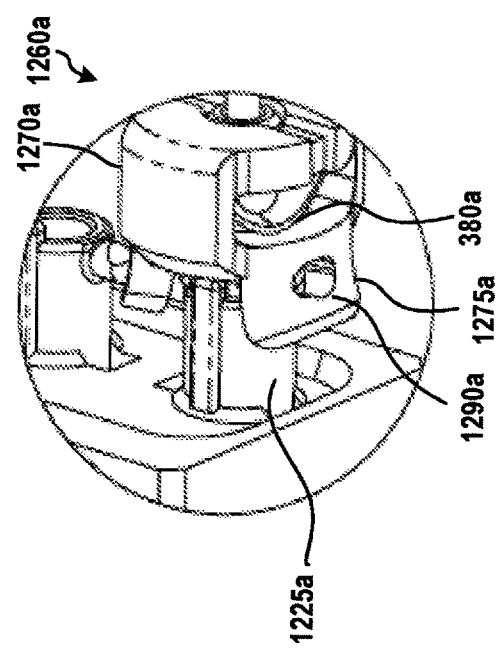
Figure 16E:
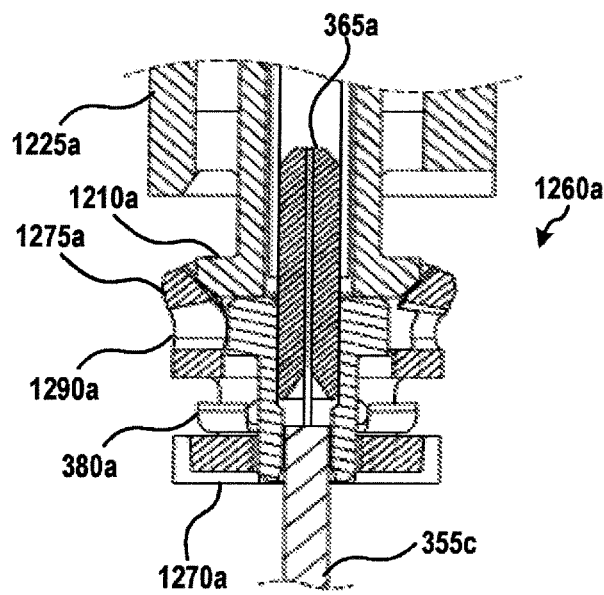
Figure 16F:
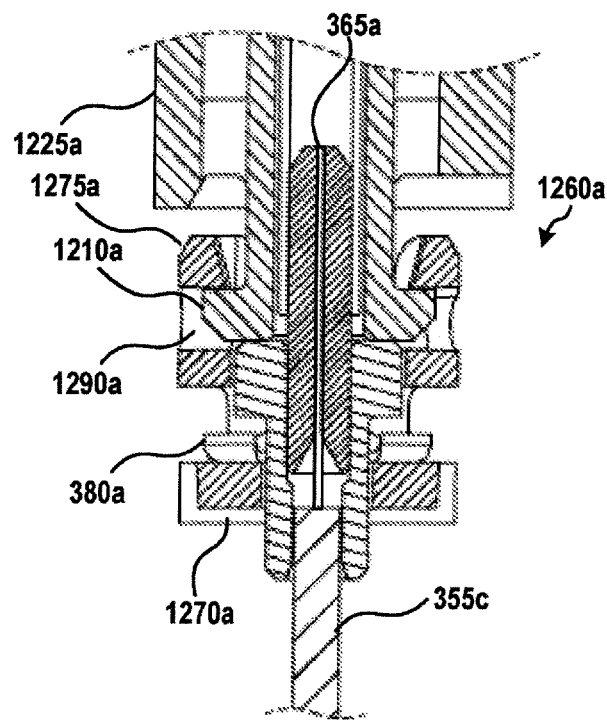

FIGS. 16A-16F depict an illustrative connection assembly according to the first embodiment. In particular, FIGS. 16A-16F depict an illustrative process for connecting a connector assembly 1260a to the adapter 1205. As shown in FIGS. 16A and 16B, an installer may align the ferrule 365a with the alignment sleeve 355a and the mating component (which may also operate as an alignment sleeve holder) 1225a and initiate moving the connector assembly 1260a toward the first side 301 of the adapter 1205 to place the ferrule within the alignment sleeve. As shown in FIGS. 16C and 16D, the connector assembly 1260a may be positioned over the mating component 1225a in an orientation such that the locking post 1210a may engage the wall 1275a. FIG. 16D depicts the detail area 1605 of FIG. 16C. In addition, the connector assembly 1260a may be positioned over the mating component 1225a in an orientation such that alignment key 1220a aligns with the alignment slot 505. As the mating housing 1270s moves over the mating component 1225a, the locking post 1210a deflects the wall 1275a outward until the locking post enters the corresponding post opening 1290a. For example, FIG. 16E depicts a cross-sectional view of the locking post 1210a deflecting the wall 1275a. When the locking post 1210a enters the post opening 1290a, the wall 1275 returns to its original position and the mating housing 1270 is coupled to the mating component 1225a. For example, FIG. 16F depicts a cross-sectional view of the locking post 1210a within the post opening 1290a such that the mating housing 1270a and, therefore, the connector assembly 1260a, is coupled to the hybrid adapter 1205.

FIGS. 17A-17I depict an illustrative connection assembly according to the first embodiment. In particular, FIGS. 17A-17I depict an illustrative process for disconnecting a connector assembly 1260a from the adapter 1205. FIGS. 17A and 17B depict the mating housing 1270a installed on the mating component 1225a, for example, with the locking post 1210a arranged within the post openings 1290a. FIG. 17B depicts a cross-sectional view through line Y-Y of FIG. 17A. FIGS. 17C and 17D depict the connection assembly 1200 when the mating housing 1270a has been rotated. FIG. 17D depicts a cross-sectional view through line Y-Y of FIG. 17E. In some embodiments, the mating housing 1270a may be configured to rotate in a single direction, for instance, due to the housing wall 1540s, 1540b having a non-symmetric thickness, to release the locking posts 1210a, 1210c from the post openings 1290a. FIGS. 17E and 17G depict the connection assembly 1200 when the mating housing 1270a has been rotated such that the locking posts 1210a, 1210c have been fully released from the corresponding post opening 1290a. FIG. 17F depicts a cross-sectional view through line Y-Y of FIG. 17E and FIG. 17G depicts a cross-sectional view through line Z-Z of FIG. 17E. FIG. 17H depicts the connection assembly 1200 when the mating housing 1270a has released from the adapter 1205. FIG. 17I depicts a cross-sectional view through line Z-Z of FIG. 17H.

Various embodiments of hybrid adapters disclosed herein may also be configured for use with other simplified connectors rather than micro connectors on one side. Also, in lieu of duplex LC adapters, embodiments may be configured for use with other standard size adapters, such as single LC adapters, on the opposite side.

One advantage of embodiments of adapters and connectors provided herein is reduction of the adapter size on the side that protrudes inside a module. Another advantage is inclusion of a ferrule spring to allow ferrule motions without the need for a full sized connector on the adapter side that, for example, protrudes inside a module. Specifically, embodiments provide an LC adapter having a smaller size inside a module, and providing a spring loaded motion for the optical fiber ferrule inside the module when the adapter is mated externally with a conventional LC connector. Thus, various embodiments require less space inside a module, as compared to conventional adapters, without sacrificing optical performance.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An optical fiber connection assembly, comprising:
an adapter comprising:
a first adapter end configured to be coupled to a first connector type,
a second adapter end configured to be coupled to a second connector type, and
at least one mating component arranged on the first adapter end, the at least one mating component being an alignment sleeve holder configured to receive an alignment sleeve; and
at least one first optical fiber micro connector comprising a mating housing configured to couple the at least one first optical fiber micro connector to the alignment sleeve holder,
wherein the alignment sleeve holder is configured such that the alignment sleeve can be inserted into the alignment sleeve holder through the first adapter end;
wherein the alignment sleeve holder extends outwardly from a remainder of the first adapter end to a position in which the alignment sleeve holder protrudes from the remainder of the first adapter end and forms an external protrusion on the adapter, and
wherein the alignment sleeve holder comprises a locking feature formed on the external protrusion of the adapter configured for interlocking engagement with the first connector type.

2. The optical fiber connection assembly of claim 1, wherein the second connector type is a duplex LC connector.

3. The optical fiber connection assembly of claim 1, further comprising a tension element arranged between the mating housing and the first adapter end, the tension element being configured to facilitate floating of a ferrule of the at least one first optical fiber micro connector, wherein the tension element comprises at least one of a wavy spring, a curved spring, and a tabbed spring.

4. The optical fiber connection assembly of claim 1, wherein the adapter is configured to be connected to a module.

5. The optical fiber connection assembly of claim 4, wherein the at least one first optical fiber micro connector further comprises a ferrule flange, the tension element being arranged between the mating housing and the ferrule flange.

6. The optical fiber connection assembly of claim 1, wherein the mating component comprises at least one post configured to engage the mating housing.

7. The optical fiber connection assembly of claim 1, wherein the mating housing is configured to rotatably engage the mating component via a bayonet-type connection.

8. The optical fiber connection assembly of claim 1, wherein the mating housing is configured to rotatably engage the mating component via a groove-based bayonet-type connection.

9. The optical fiber connection assembly of claim 1, wherein the mating housing is configured to engage the mating component via a snap-fit bayonet-type connection.

10. The optical fiber connection assembly of claim 1, further comprising an electromagnetic interference shield arranged at the first adapter end.

11. The optical fiber connection assembly of claim 1, further comprising the alignment sleeve.

12. The optical fiber connection assembly of claim 1, further comprising an alignment key arranged on the alignment sleeve holder, the alignment key being configured to align a portion of the first optical fiber micro connector.

13. The optical fiber connector assembly of claim 12 wherein the alignment sleeve holder is configured to couple to the first connector type.

14. An optical fiber adapter, comprising:
a first adapter end configured to be coupled to a first connector type;
a second adapter end configured to be coupled to a second connector type; and
at least one mating component arranged on the first adapter end, the mating component being an alignment sleeve holder configured to receive an alignment sleeve and further configured to be coupled to at least one first optical fiber micro connector comprising a mating housing configured to couple the at least one first optical fiber micro connector to the alignment sleeve holder;
wherein the alignment sleeve holder is configured such that the alignment sleeve can be inserted into the alignment sleeve holder through the first adapter end;
wherein the alignment sleeve holder extends outwardly from a remainder of the first adapter end to a position in which the alignment sleeve holder protrudes from the remainder of the first adapter end and forms an external protrusion on the adapter and
wherein the alignment sleeve holder comprises a locking feature formed on the external protrusion of the adapter configured for interlocking engagement with the first connector type.

15. The optical fiber adapter of claim 14, wherein the second connector type is a duplex LC connector.

16. The optical fiber adapter of claim 14, further comprising a tension element arranged between the mating housing and the first adapter end, the tension element being configured to facilitate floating of a ferrule of the at least one first optical fiber micro connector, wherein the tension element comprises at least one of a wavy spring, a curved spring, and a tabbed spring.

17. The optical fiber adapter of claim 14, wherein the adapter is configured to be connected to a module.

18. The optical fiber adapter of claim 14, wherein the mating component comprises at least one post configured to engage the mating housing.

19. The optical fiber adapter of claim 14, wherein the mating housing is configured to rotatably engage the mating component via a bayonet-type connection.

\* \* \* \* \*